(12) United States Patent
Thurling et al.

(10) Patent No.: US 11,842,649 B2
(45) Date of Patent: *Dec. 12, 2023

(54) SUPERVISORY SAFETY SYSTEM FOR CONTROLLING AND LIMITING UNMANNED AERIAL SYSTEM (UAS) OPERATIONS

(71) Applicant: AeroVironment, Inc., Arlington, VA (US)

(72) Inventors: Andrew Joseph Thurling, Simi Valley, CA (US); Joseph Frank Mohos, Burbank, CA (US)

(73) Assignee: AEROVIRONMENT, INC., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/972,109

(22) Filed: Oct. 24, 2022

(65) Prior Publication Data

US 2023/0055318 A1    Feb. 23, 2023

Related U.S. Application Data

(63) Continuation of application No. 16/747,850, filed on Jan. 21, 2020, now Pat. No. 11,514,802, which is a continuation of application No. 14/974,259, filed on Dec. 18, 2015, now Pat. No. 10,621,876.

(60) Provisional application No. 62/094,798, filed on Dec. 19, 2014.

(51) Int. Cl.
*G08G 5/00*    (2006.01)

(52) U.S. Cl.
CPC .......... *G08G 5/006* (2013.01); *G08G 5/0013* (2013.01); *G08G 5/0021* (2013.01); *G08G 5/0069* (2013.01)

(58) Field of Classification Search
None
See application file for complete search history.

(56) References Cited

U.S. PATENT DOCUMENTS

| | | | |
|---|---|---|---|
| 7,256,728 B1 | 8/2007 | Kenny et al. | |
| 2003/0227395 A1* | 12/2003 | Zeineh | G08G 5/0013 340/988 |
| 2004/0179848 A1 | 9/2004 | Belenkii | |
| 2004/0249519 A1 | 12/2004 | Frink | |
| 2006/0217877 A1 | 9/2006 | Bodin et al. | |

(Continued)

FOREIGN PATENT DOCUMENTS

| | | |
|---|---|---|
| EP | 2685336 A1 | 1/2014 |
| JP | 2007237873 A | 9/2007 |

(Continued)

OTHER PUBLICATIONS

King, UAV Failure Rate Criteria for Equivalent Level of Safety, 2005 (Year: 2005).*

(Continued)

*Primary Examiner* — Lail A Kleinman
(74) *Attorney, Agent, or Firm* — Concept IP LLP; Pejman Yedidsion; Eric Aagaard

(57) ABSTRACT

Systems, devices, and methods for determining, by a processor, an unmanned aerial system (UAS) position relative to at least one flight boundary; and effecting, by the processor, at least one flight limitation of a UAS if the determined UAS position crosses the at least one flight boundary.

20 Claims, 19 Drawing Sheets

(56) References Cited

U.S. PATENT DOCUMENTS

| | | |
|---|---|---|
| 2006/0241820 A1 | 10/2006 | Dwyer et al. |
| 2008/0243383 A1 | 10/2008 | Lin |
| 2009/0027253 A1 | 1/2009 | Tooren et al. |
| 2009/0210109 A1 | 8/2009 | Ravenscroft |
| 2009/0212167 A1 | 8/2009 | Kunz |
| 2011/0035149 A1 | 2/2011 | McAndrew et al. |
| 2014/0018979 A1 | 1/2014 | Goossen et al. |
| 2014/0231590 A1 | 8/2014 | Trowbridge et al. |
| 2014/0236388 A1 | 8/2014 | Wong et al. |
| 2014/0249693 A1 | 9/2014 | Stark et al. |
| 2014/0330457 A1 | 11/2014 | Papadopoulos et al. |
| 2015/0153740 A1 | 6/2015 | Ben-Shachar et al. |
| 2015/0232181 A1* | 8/2015 | Oakley ............ B64C 39/024 244/17.23 |
| 2015/0254988 A1* | 9/2015 | Wang ............ G08G 5/0021 701/3 |
| 2015/0348424 A1 | 12/2015 | Duffy et al. |
| 2016/0116912 A1 | 4/2016 | Nehmadi et al. |
| 2016/0171896 A1* | 6/2016 | Buchmueller ...... G08G 5/0008 701/3 |

FOREIGN PATENT DOCUMENTS

| | | |
|---|---|---|
| JP | 2010095246 A | 4/2010 |
| JP | 2014040231 A | 3/2014 |
| JP | 2014126468 A | 7/2014 |
| JP | 2014181034 A | 9/2014 |
| JP | 2016539838 A | 12/2016 |
| WO | 2008051236 A3 | 9/2008 |
| WO | 2015157883 A1 | 10/2015 |

OTHER PUBLICATIONS

International Search Report for PCT Serial No. PCT/US2015/066624, dated Mar. 11, 2016.

King, UAV Failure Rate Criteria for Equivalent Level of Safety. Sep. 2005.

* cited by examiner

SUPERVISORY SAFETY SYSTEM FOR CONTROLLING AND LIMITING UNMANNED AERIAL SYSTEM (UAS) OPERATIONS

CROSS-REFERENCE TO RELATED APPLICATIONS

This application is a continuation of U.S. Nonprovisional patent application Ser. No. 16/747,850, filed Jan. 21, 2020, which is a continuation of U.S. Nonprovisional patent application Ser. No. 14/974,259, filed Dec. 18, 2015, which issued as U.S. Pat. No. 10,621,876 on Apr. 14, 2020, which claims priority to and the benefit of U.S. Provisional Patent Application No. 62/094,798, filed Dec. 19, 2014, the contents of all of which are hereby incorporated by reference herein for all purposes.

TECHNICAL FIELD

Embodiments relate generally to systems, methods, and devices for unmanned aerial systems (UAS), and more particularly to limiting access of UAS.

BACKGROUND

To allow operations of unmanned aerial systems (UAS) in the national airspace, highly reliable means and methods are necessary to assure that UAS do not enter airspace from which it is restricted/prohibited, collide with and/or otherwise interfere with the operations of manned aircraft. However, in meeting this need the cost and complexity of UAS must be kept reasonable in order to facilitate their commercial viability.

A common limitation given in a Certificate of Waiver or Authorization (COA) requires a UAS to specifically avoid airports by a distance of at least five nautical miles. This area around the airport is intended to act as a buffer to keep the UAS away from any manned aircraft that may be flying in the airport traffic pattern. Since there is no actual physical barrier, a wayward, whether accidental or intentional, UAS can still cross this buffer and relatively quickly be in close proximity with manned aircraft. As a result, such a buffer may mitigate the likelihood of a midair collision, but ultimately cannot act to prevent it. More specifically, nothing physically prevents the UAS from being involved in a potentially fatal midair collision with a manned aircraft in the airport traffic pattern. Since the worst credible result of the midair collision hazard is a fatality, this hazard would be assigned a "catastrophic" criticality.

SUMMARY

Exemplary method embodiments may include: determining, by a processor, an unmanned aerial system (UAS) position relative to at least one flight boundary; and effecting, by the processor, at least one flight limitation of the UAS if the determined UAS position crosses the at least one flight boundary. In additional exemplary method embodiments, the at least one flight boundary may include a prohibited flight area. In additional exemplary method embodiments, the at least one flight limitation may have a sufficiently high system integrity, e.g., of at least $1*10^{-7}$, of preventing the UAS from crossing the prohibited flight area. In additional exemplary method embodiments, the received at least one flight boundary may further include a user defined flight boundary, where the user defined flight boundary is smaller than the prohibited flight area. In additional exemplary method embodiments, the at least one flight boundary may further include at least one boundary based on an input from a sense and avoid system of the UAS. In additional exemplary method embodiments, the sense and avoid system may include at least one of: a radar, a sonar, an optical sensor, and a LIDAR.

In additional exemplary method embodiments, the at least one flight boundary is updated by a user from a third-party database prior to a flight. In additional exemplary method embodiments, the at least one flight boundary may be updated during flight by at least one of: a sense and avoid system and a third-party database. In additional exemplary method embodiments, the UAS position may be determined via a global positioning system (GPS), an inertial measurement unit (IMU), and an altimeter. Additional exemplary method embodiments may include effecting, by the processor, at least one flight limitation of the UAS if the UAS encounters an error and the determined UAS position is in a trajectory that will cross the at least one flight boundary within a set time. In additional exemplary method embodiments, the error may be at least one of: a battery failure, a propulsion device failure, a sense and avoid system failure, and a global positioning system (GPS) failure.

In additional exemplary method embodiments, a first flight limitation of the at least one flight limitation may include: sending, by the processor, a warning to a user when a first boundary of the at least one flight boundary is crossed by the UAS. In additional exemplary method embodiments, a second flight limitation of the at least one flight limitation may include grounding the UAS. In additional exemplary method embodiments, the at least one flight limitation of the UAS may include at least one of: activating a parachute; cutting a power source to one or more propulsion devices of the UAS; separating one or more components of the UAS; an explosive charge; and reversing power to one or more propulsion devices of the UAS. In additional exemplary method embodiments, the at least one flight limitation of the UAS may include at least one of: actuating an actuator to a maximum deflection; and actuating an actuator to effect a turn of the UAS away from the received one or more flight boundaries.

Exemplary system embodiments may include a flight limiting controller (FLC) including: a processor having addressable memory, the processor configured to: determine an unmanned aerial system (UAS) position relative to at least one flight boundary; and effect at least one flight limitation of the UAS if the determined UAS position crosses the at least one flight boundary. In additional exemplary system embodiments, the system may also include a UAS including: a UAS power source; a UAS controller; a UAS navigation device; a UAS radio; and at least one propulsion device. In additional exemplary system embodiments, the UAS navigation device may further include a global positioning system (GPS), an inertial measurement unit (IMU), and an altimeter. In additional exemplary system embodiments, the UAS radio may further include a transceiver.

In additional exemplary system embodiments, the UAS may further include: at least one control surface; and at least one actuator attached to the at least one control surface. In additional exemplary system embodiments, the at least one flight limitation of the UAS may be an actuation of the at least one actuator to a maximum deflection. In additional exemplary system embodiments, the processor of the flight limiting controller may be configured to receive an input from at least one of: the UAS power source, the UAS controller, the UAS navigation device, the UAS radio, and the at least one propulsion device. In additional exemplary system embodiments, the system may further include a UAS operator controller including: a UAS operator controller processor having addressable memory, the UAS controller processor configured to: receive a status of the UAS, where the status includes data on at least one of: the UAS power source, the UAS controller, the UAS navigation device, the UAS radio, and the at least one propulsion device; and receive a warning if the determined UAS position crosses the at least one flight boundary.

In additional exemplary system embodiments, the FLC may further include: a FLC power source; a FLC controller; a FLC navigation device; and a FLC radio. In additional exemplary system embodiments, the FLC may further include a FLC memory store, where the FLC memory store may record a flight data of a UAS, where the flight data may include an input from at least one of: the FLC power source; the FLC controller; the FLC navigation device; and the FLC radio. In additional exemplary system embodiments, the at least one flight limitation of the UAS may include at least one of: activate a parachute; cut a power source to one or more propulsion devices of the UAS; separate one or more components of the UAS; an explosive charge; and reverse power to one or more propulsion devices of the UAS. In additional exemplary system embodiments, the at least one flight limitation of the UAS may include at least one of: actuate an actuator to a maximum deflection; and actuate an actuator to effect a turn of the UAS away from the received one or more flight boundaries.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

The present system allows for a highly reliable supervisory device for an unmanned aerial system (UAS). The system monitors and evaluates the UAS position in a three-dimensional space and compares that location to one or more flight boundaries. If, and when, the UAS crosses the border of such a flight boundary, the system will automatically activate at least one flight limitation. Flight limitations may include a warning signal to a UAS operator, an autopilot command to leave the flight boundary, an actuator command to maintain the UAS in a circular flight pattern that prevents the UAS from entering a flight boundary, a parachute or other emergency recovery device deployment, a component separation such as a wing of the UAS, a propulsion device throttle adjustment, a cutting of power to one or more propulsion devices of the UAS, and a separate thrust generator. The system may be embodied as a fully integrated device into existing UAS components, e.g., a UAS controller, global positioning system (GPS), inertial measurement unit (IMU), altimeter, battery, memory, etc.; a fully separate device that may be detachably attached to various UAS; or some combination of separate and existing components. This system allows an off-the-shelf UAS with a relatively low operational reliability, e.g., an inexpensive UAS, to be paired with a separate highly reliable flight termination device, such that in combination a system is achieved that will prevent the UAS from entering airspace from which it is prohibited and/or flying over areas on the ground that are dangerous, prohibited, and/or are otherwise forbidden from UAS overflight.

Figure 1:
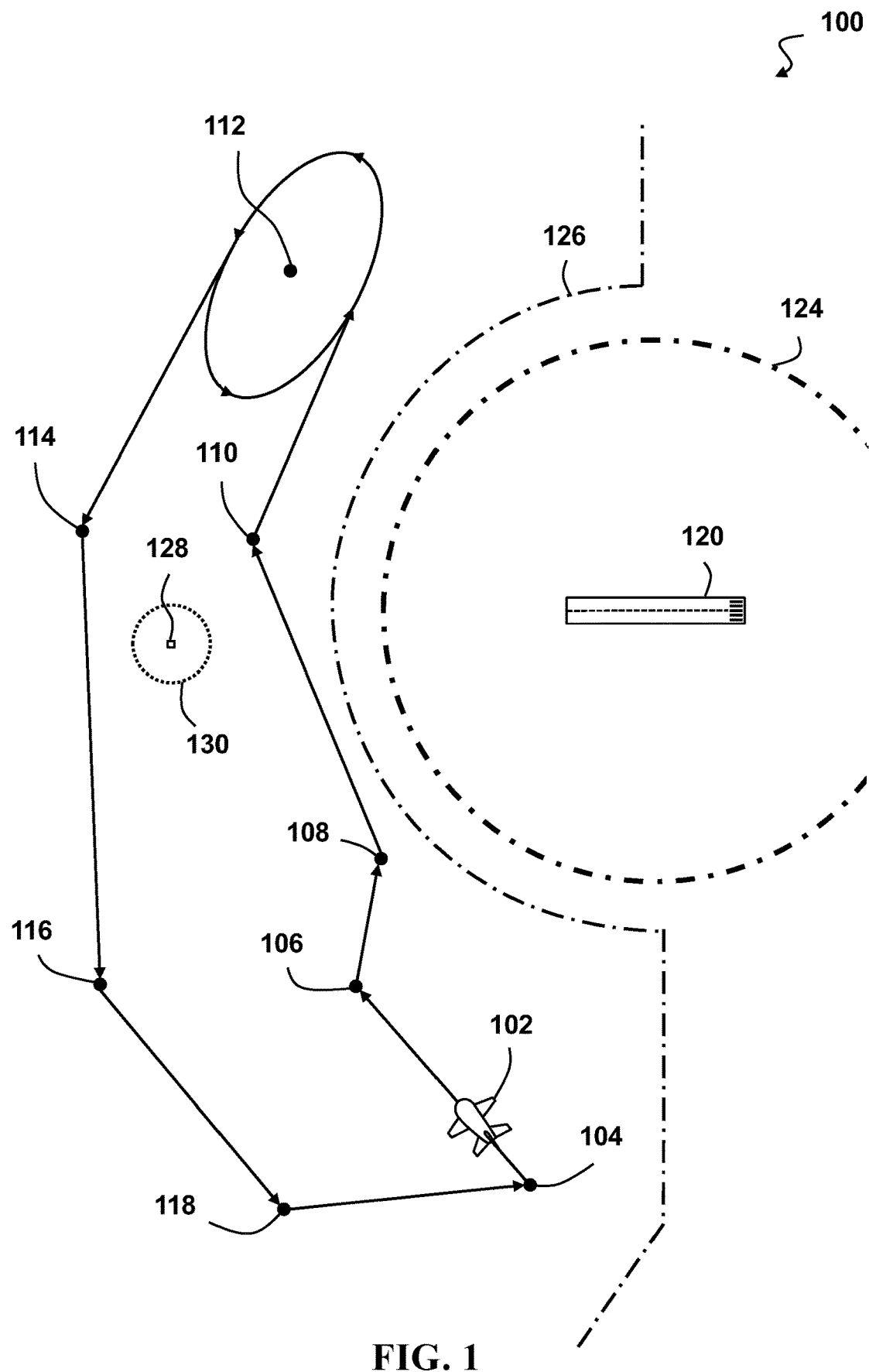
FIG. 1 depicts an exemplary embodiment of an unmanned aerial system (UAS) in a flight path traveling through waypoints to an area of operation, where the UAS stays out of a flight boundary and buffer zone for an airport and a tower.

FIG. 1 depicts an exemplary embodiment of an unmanned aerial system (UAS) in a flight path near an area of controlled airspace that stays out of a flight boundary for an airport and a tower 100. A UAS 102 is launched from a base location 104. The UAS 102 travels between waypoints (106, 108, 110) to reach an area of operation 112. The UAS 102 loiters about the area of operation 112 collecting data and/or performing mission functions. The UAS 102 returns to the base location 104 via waypoints (114, 116, 118). The waypoints (106, 108, 110, 114, 116, 118) and/or area of operation 112 may be defined by a UAS operator in order to avoid entering a flight boundary, e.g., a geofence including a controlled airspace and/or other obstacle. The flight boundary may be a virtual surface defined by horizontal dimensions and a vertical height relative to ground. The flight boundary may be a simple geometric shape, e.g., a cylinder or dome, or a complex multipoint surface. In some embodiments, the waypoints (106, 108, 110, 114, 116, 118) may be determined by a processor of the UAS based on the location of the area of operation 112, any flight boundaries, and/or additional UAS sensor inputs, e.g., wind speed, UAS battery level, etc.

The controlled airspace may include an airport 120 having a prohibited flight area 124 of a set distance, e.g., five nautical miles surrounding the airport 120. This prohibited flight area 124 may be set by a governmental agency based on rules and regulations, e.g., the Federal Aviation Administration (FAA). UAS are not allowed to cross the prohibited flight area 124. A first flight boundary 126 may be created as a buffer to ensure that the UAS 102 does not enter the prohibited flight area 124 and an area generally north and south of the airport which corresponds to the flight routes of aircraft utilizing the airport 120. Flight boundaries may vary based on various established rules, regulations, and/or prohibited flight areas. Flight boundaries may be established by a governmental authority and/or a third-party database.

Other obstacles to the UAS 102 may be present in a flight area, but not restricted by a governmental authority and/or a third-party database. A tower 128 is located within the UAS 102 flight area, but not otherwise restricted. The UAS operator aware of the tower 128 location may create a second user defined flight boundary 130 surrounding the tower 128 to ensure that the UAS 102 does not impact and/or interfere with the tower 128.

The UAS 102 may store the locations of the flight boundaries (124, 126, 130) in memory. These flight boundaries (124, 126, 130) may be downloaded from a governmental authority and/or third party database. A UAS operator may add additional flight boundaries to reduce the flight area, but may not remove existing flight boundaries. In some embodiments, flight boundaries may be updated in real-time, e.g., restricting an area for emergency or natural disaster needs such as firefighting activities.

The UAS 102 may provide the UAS operator with status information on the UAS flight location, speed, and/or other data collected. The UAS 102 may also provide the UAS operator with a warning if a flight boundary is crossed by the UAS 102. The UAS 102 may effect at least one flight limitation upon crossing a flight boundary. These flight limitations may range from warning signals to a grounding of the UAS 102 (See FIGS. 2A-2H).

Figure 2A:
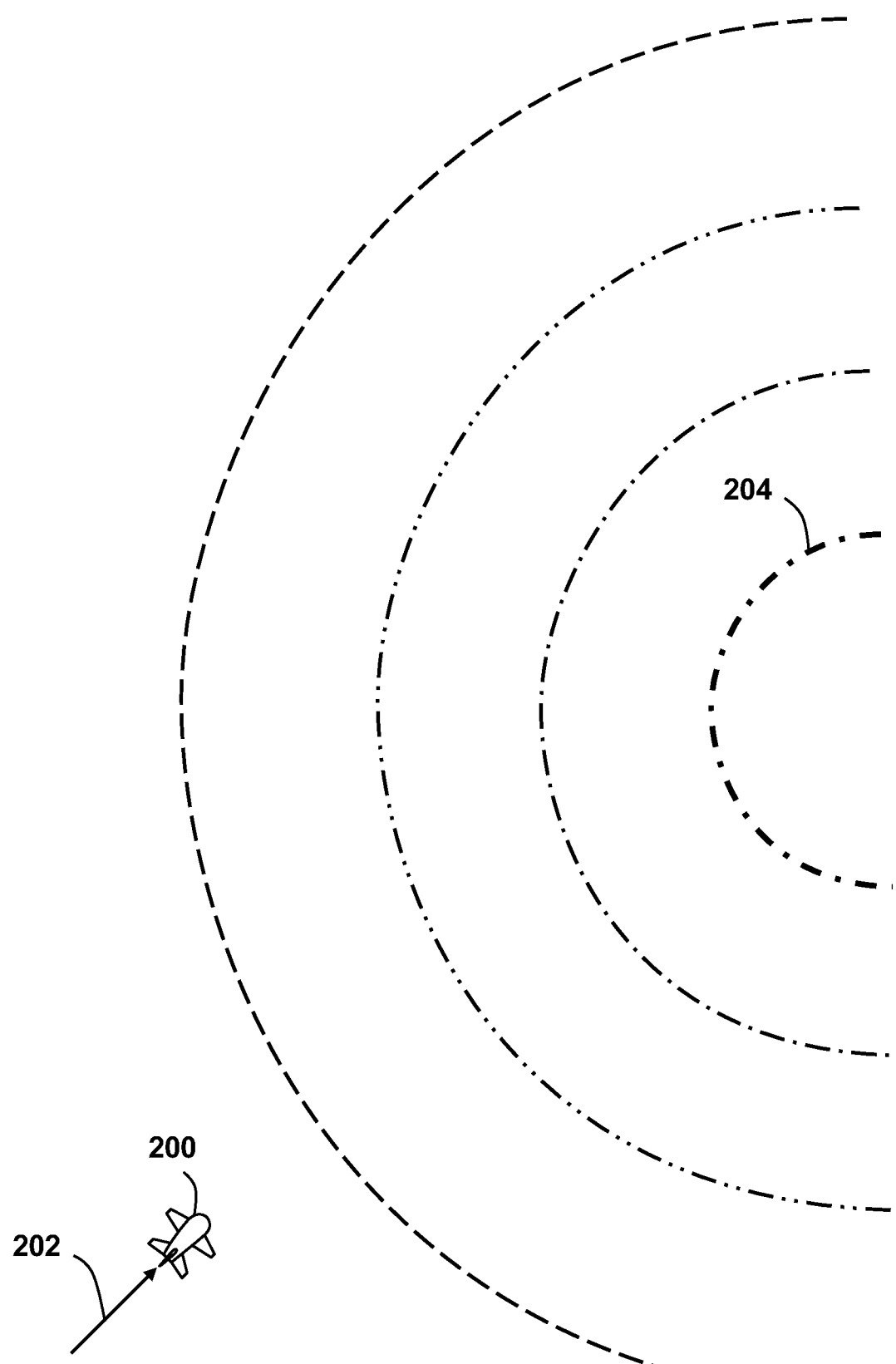
FIG. 2A depicts an exemplary UAS in a trajectory towards a airspace from which it is prohibited surrounded by three flight boundaries.

FIG. 2A depicts an exemplary UAS approaching several flight boundaries positioned about a airspace from which it is prohibited. A UAS 200 is traveling in a trajectory 202 towards a prohibited flight area 204. One or more flight boundaries may be created to ensure that the UAS 200 does not cross into the prohibited flight area 204. The prohibited flight area 204 may include an airport (See FIG. 1) or other location in which UAS interference may be "catastrophic" as it could result in a midair collision. Accordingly, the level of system integrity required of safety functions providing mitigation for "catastrophic" criticality is $1*10^{-6}$ for small general aviation aircraft and $1*10^{-9}$ for larger aircraft. While it is yet to be determined what the requirement for UAS will be, it is likely to be at least equal to that of the manned aircraft that populate the airspace 124, i.e., between $1*10^{-6}$ and $1*10^{-9}$, or approximately $1*10^{-7}$. This is a very high reliability requirement and is levied not just on the UAS as a whole, but on each part of the UAS involved in mitigating the "catastrophic" hazard. Accordingly, the reliability of a system for preventing the UAS 200 from crossing into a prohibited flight area 204 must be at least $1*10^{-7}$.

The UAS 200 may be an unmanned aircraft having a propulsion device, e.g., a motor, and at least one control surface. In some embodiments, the UAS 200 may have one or more propulsion devices in order to control the altitude, velocity, and/or trajectory 202 of the aircraft. The UAS 200 may be an unpowered aircraft such as a balloon, parachute, glider, and/or kite where the at least one flight limitation may ground the unpowered aircraft before it can enter a prohibited flight area 204. The UAS 200 may be a lighter than air aircraft, such as an airship or dirigible. The one or more flight limitations prevent the UAS 200 from entering the prohibited flight area 204 based on the type of propulsion, lift, and/or control of the UAS 200.

Figure 2B:
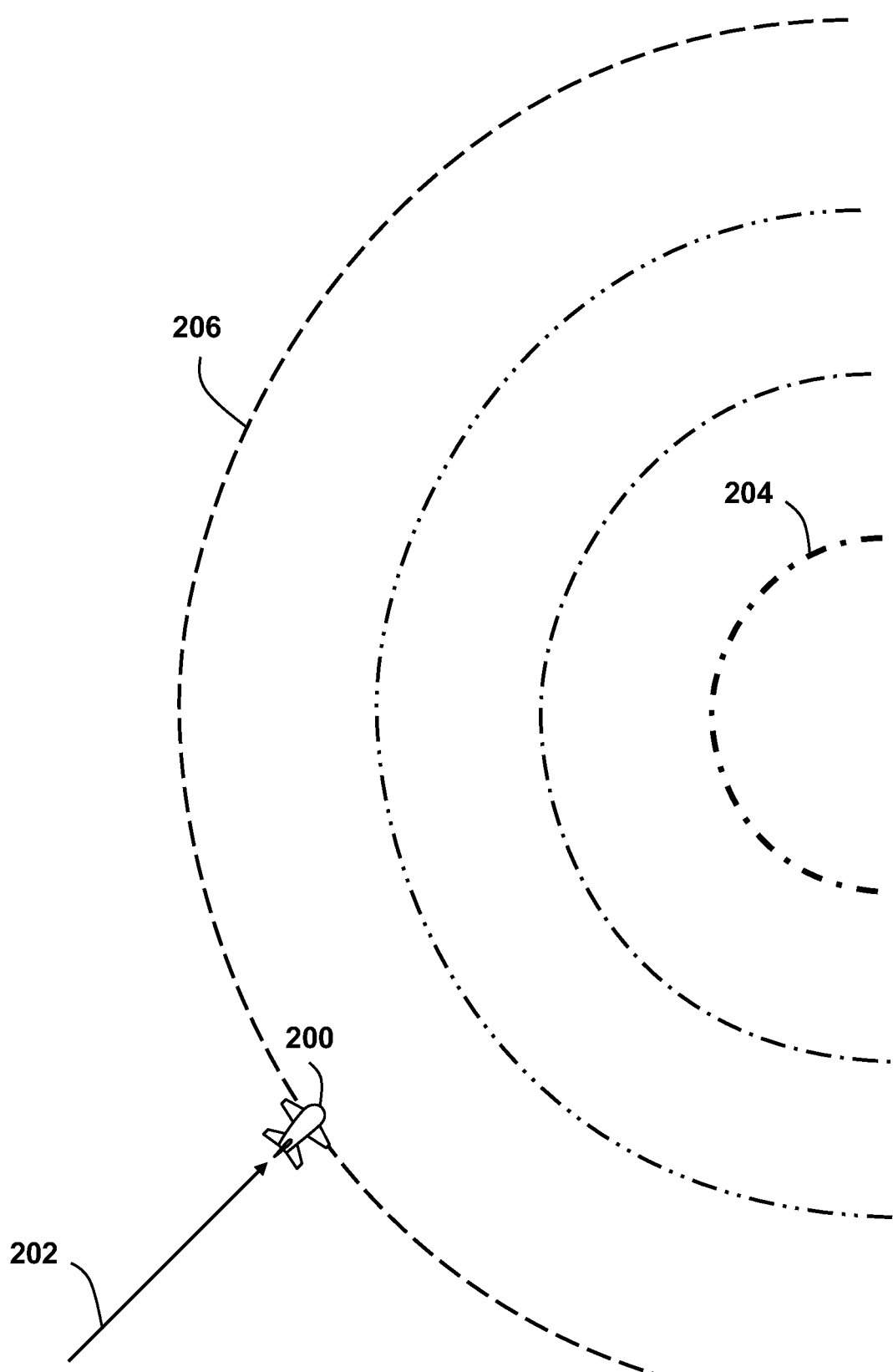
FIG. 2B depicts the exemplary UAS of FIG. 2A crossing over a first flight boundary of the three flight boundaries surrounding the airspace from which it is prohibited.

FIG. 2B depicts the exemplary UAS of FIG. 2A crossing over a first flight boundary. The UAS 200 is on a trajectory 202 that has it crossing a first flight boundary 206 surrounding the prohibited flight area 204. The location of each flight boundary may be time-based, e.g., the first flight boundary 206 may be sixty seconds from the prohibited flight area 204 based on the speed and/or trajectory 202 of the UAS 200. Each flight boundary may also be based on a set buffer distance, e.g., the first flight boundary 206 may be one mile from the prohibited flight area 204. In some embodiments, the location of one or more flight boundaries may be set by a UAS operator. In other embodiments, the location of each flight boundary may be based on a combination of time-based factors and distance, e.g., varying within a set range and/or selected by a UAS operator within a set range.

The number of flight boundaries may be varied by a flight limiting controller (FLC) and/or a UAS controller as a dynamic system for ensuring that the UAS 200 does not cross into the prohibited flight area 204. Upon crossing the first flight boundary 206, the FLC and/or UAS controller may send a signal to a UAS operator notifying the UAS operator that the UAS 200 has crossed the first flight boundary 206. This notification may provide the operator with the chance to alter the trajectory 202 of the UAS 200 before any further actions, e.g., grounding the UAS, are taken.

Figure 2C:
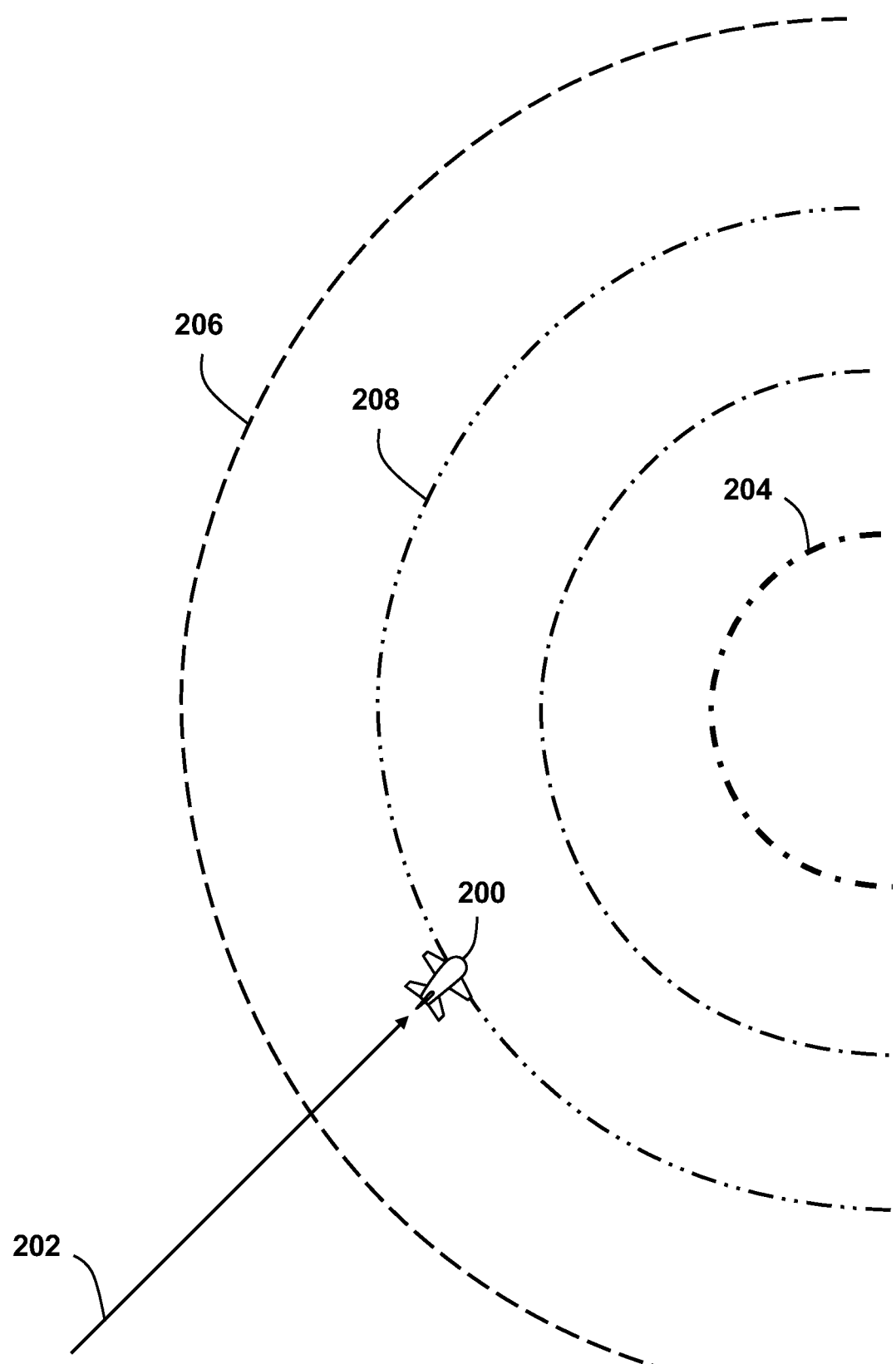
FIG. 2C depicts the exemplary UAS of FIG. 2A having flown past the first flight boundary and crossing over a second flight boundary.

FIG. 2C depicts the exemplary UAS of FIG. 2A crossing over a second flight boundary. The trajectory 202 of the UAS 200 continues towards the prohibited flight area 204 and crosses over a second flight boundary 208. The FLC and/or UAS controller effect a second flight limitation upon the UAS 200 crossing the second flight boundary 208. The second flight limitation may direct the UAS controller to land the UAS, reverse a direction of the UAS (See FIG. 2D), and/or other maneuvers to prevent the UAS 200 from entering the prohibited flight area 204. The distance between the first flight boundary 206 and the second flight boundary 208 may allow the UAS operator time to correct the trajectory 202 of the UAS 200. This second flight limitation may also prevent the UAS operator from taking further control of the UAS 200 until the UAS 200 is outside the second flight boundary 208 and/or landed on the ground (See FIG. 2H).

Figure 2D:
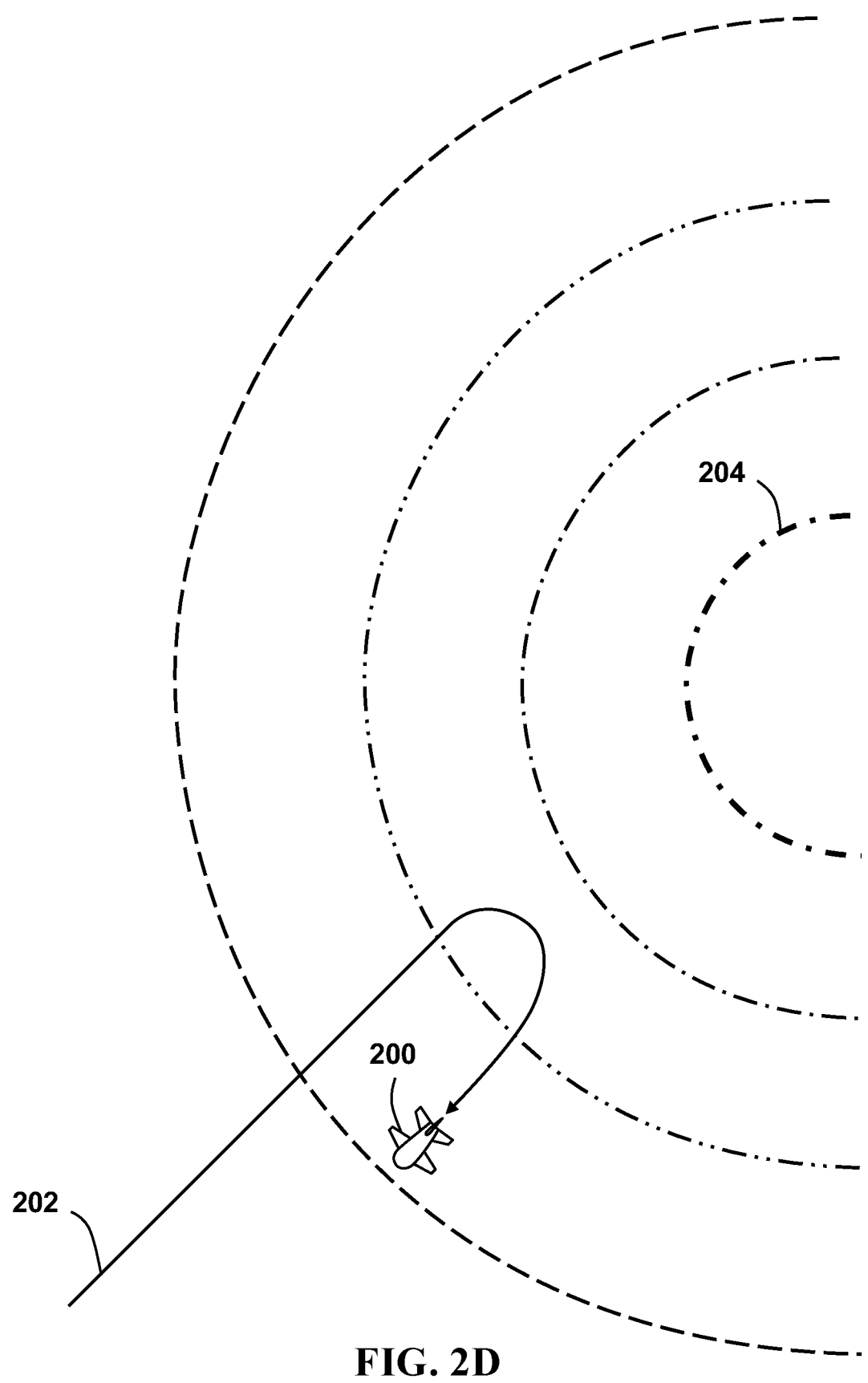
FIG. 2D depicts the exemplary UAS of FIG. 2A adjusting its flight path in a 180 degree turn away from the airspace from which it is prohibited and the second flight boundary.

FIG. 2D depicts the exemplary UAS of FIG. 2A adjusting its flight path away from the airspace from which it is prohibited and the second flight boundary. The trajectory 202 of the UAS 200 may enact a turn that takes the UAS 200 away from the prohibited flight area 204. The FLC and/or UAS controller may command an actuator, having a degree of system integrity of at least $1*10^{-7}$, to actuate such that the UAS flight course is adjusted by 180 degrees. In other embodiments, an autopilot may guide a UAS, such as a quadcopter-style UAS (See FIGS. 9-10), away from the prohibited flight area 204. The UAS 200 may communicate a confirmation of the flight path adjustment, or other flight limitation, to the UAS operator in a timely manner.

Figure 2E:
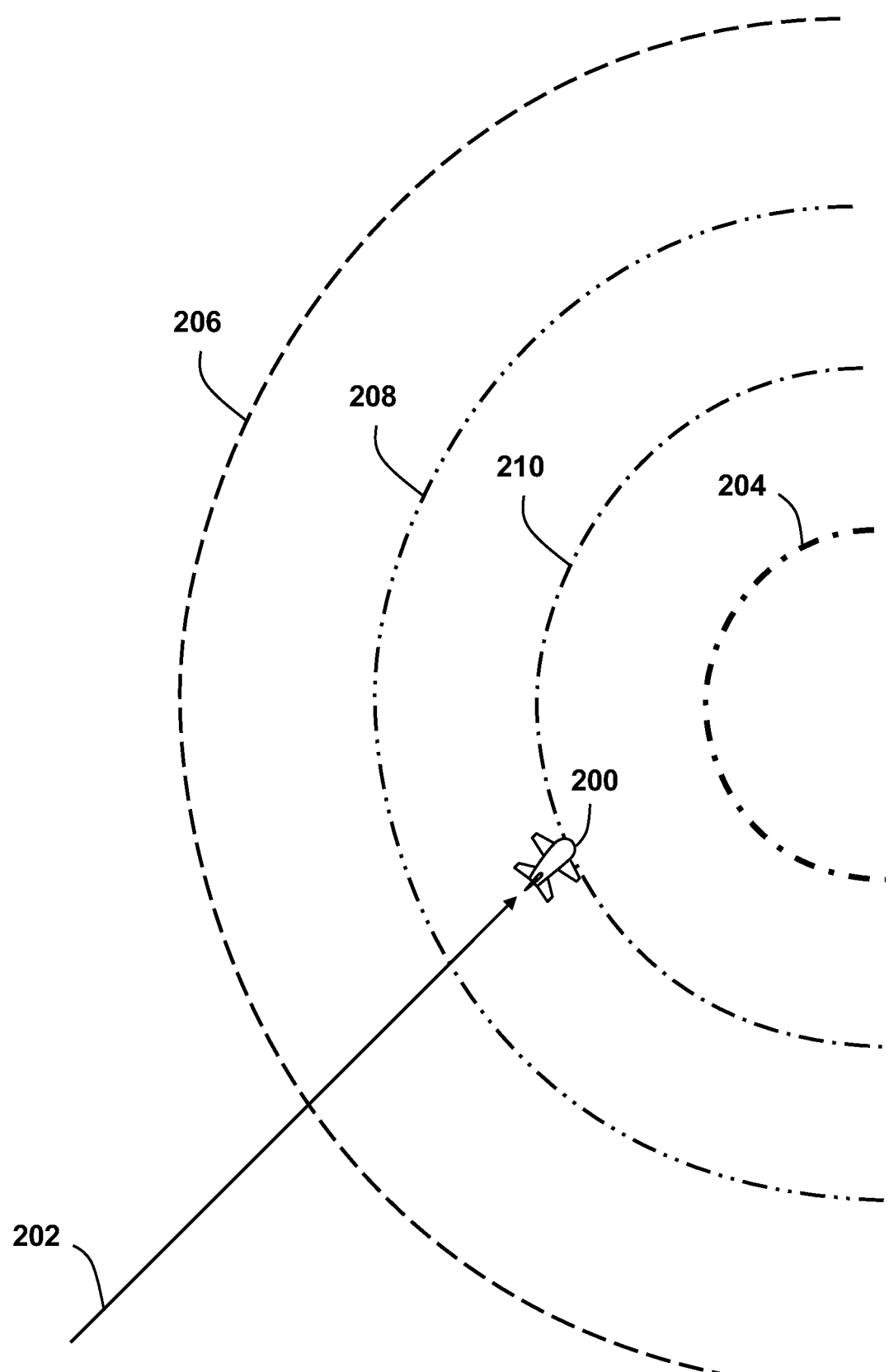
FIG. 2E depicts the exemplary UAS of FIG. 2A having flown past the first flight boundary and the second flight boundary and crossing over a third flight boundary.

FIG. 2E depicts the exemplary UAS of FIG. 2A crossing over a third flight boundary. The trajectory 202 of the UAS 200 crosses over a third flight boundary 210. The FLC and/or UAS controller effect a third flight limitation upon crossing the third flight boundary 210. The third flight limitation grounds the UAS 200 and/or otherwise prevents the UAS 200, with a degree of system integrity of at least $1*10^{-7}$, from entering the prohibited flight area 204. If crossing the second flight boundary 208 effected a second flight limitation to enact a turn that would take the UAS 200 away from the prohibited flight area 204 (See FIG. 2D), and this was ineffective, e.g., UAS controller error and/or failure, then more drastic action must be taken in order to keep the UAS 200 from entering the prohibited flight area 204.

The UAS 200 may encounter an error while in a trajectory 202 that will cross at least one flight boundary (206, 208, 210) and/or prohibited flight area 204 within a set time, e.g., within fifteen seconds. The error may be a battery failure, such as a battery running out of power and/or being otherwise not reliable to a rating of $1*10^{-7}$. The error may also be a propulsion device failure of the UAS 200, such as an actuator motor for control of a control surface of the UAS 200 being non-responsive to an operator and/or being otherwise not reliable to a rating of $1*10^{-7}$. The error may be a sense and avoid system failure, such as a radar, a sonar, an optical sensor, and/or LIDAR system being non-responsive to an operator and/or being otherwise not reliable to a rating of $1*10^{-7}$. The error may also be a GPS failure, such as a GPS losing connection to a minimum required number of satellites and/or being otherwise not reliable to a rating of $1*10^{-7}$. The error may also be a connection failure between the UAS 200 and an operator. If such an error occurs and the UAS 200 is in a trajectory 204 that will cross at least one flight boundary (206, 208, 210) and/or prohibited flight area 204 within a set time, then at least one flight limitation must be effected. If a flight limitation is not effected, then the UAS 200 will cross the at least one flight boundary (206, 208, 210) and/or prohibited flight area 204. The set time may be set by the system and/or an operator to be sufficient to ensure that the UAS 200 will not cross into the at least one flight boundary (206, 208, 210) and/or prohibited flight area 204 with a reliability of $1*10^{-7}$. The set time may also be based on and/or adjusted for a latency; data transmission time from the UAS 200 to a ground station; ground station processing time; human response time; weather effects such as wind; electromagnetic interference internal and/or external to the UAS 200; interference from acoustic, thermal, vibrational, chemical, and/or metallurgical means; and/or accuracy of UAS 200 components in order to ensure that the UAS 200 does not cross the at least one flight boundary (206, 208, 210) and/or the prohibited flight area 204. The set time may also be based on an availability of any command and control datalink or other communication links required for any avoidance maneuvers and meeting standards for ensuring that such avoidance maneuvers may be executed prior to the UAS 200 crossing the at least one flight boundary (206, 208, 210) and/or the prohibited flight area 204.

Figure 2F:
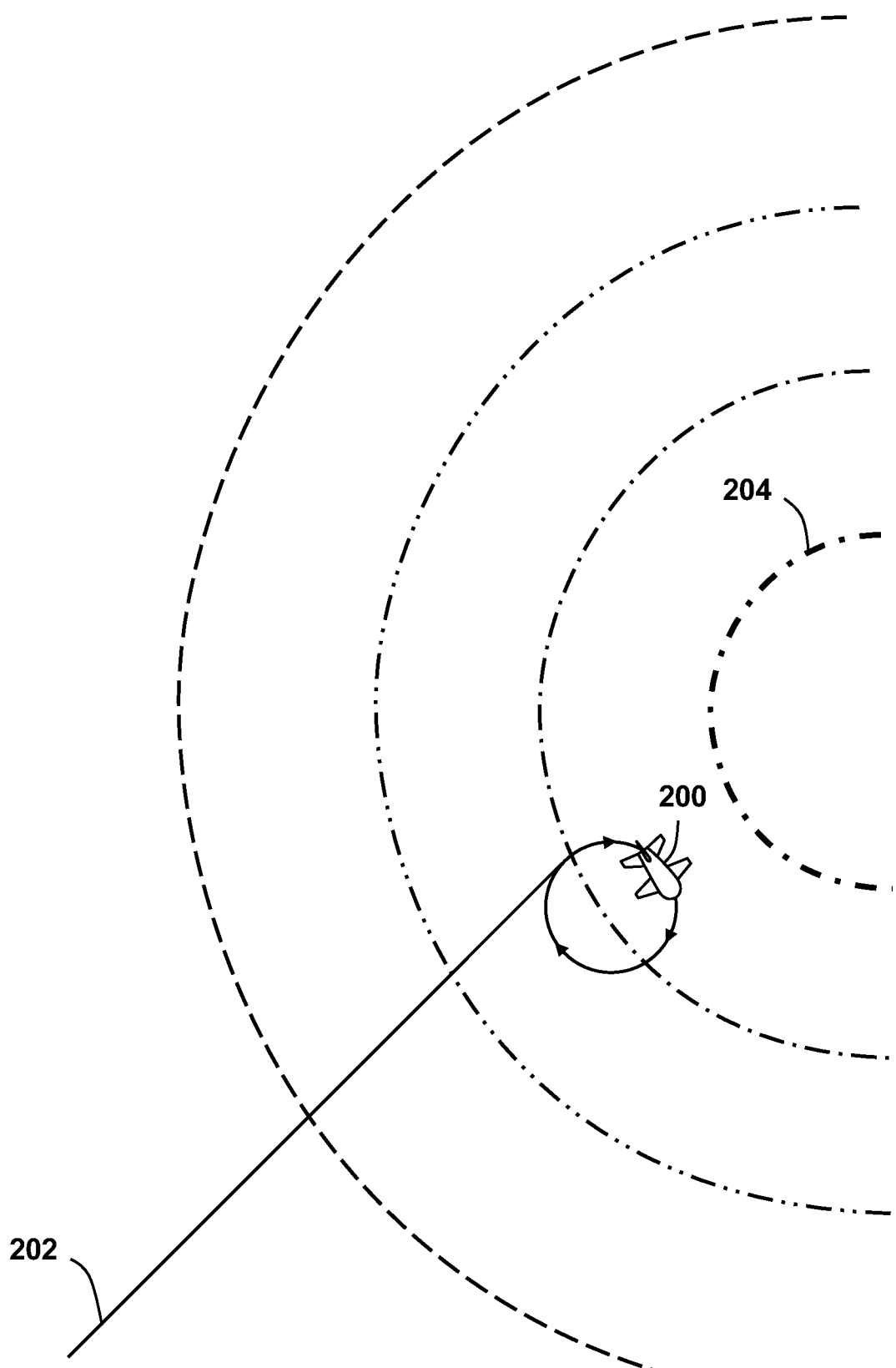
FIG. 2F depicts the exemplary UAS of FIG. 2A having actuated an actuator connected to a rudder of the UAS to a maximum deflection in order to maintain the UAS in a circular flight pattern that inhibits further forward movement and prevents the UAS from entering the airspace from which it is prohibited.

FIG. 2F depicts the exemplary UAS of FIG. 2A having actuated an actuator to a maximum deflection in order to maintain the UAS in a circular flight pattern that prevents the UAS from entering the airspace from which it is prohibited. The FLC and/or UAS controller effect a hard turn, e.g., via a full rudder deflection from an actuator, as the third flight limitation whereby the trajectory 202 of the UAS 200 enters a spiral that prevents the UAS 200 from entering the prohibited flight area 204. The spiral trajectory 202 may continue until the UAS 200 runs out of power and lands on the ground.

Figure 2G:
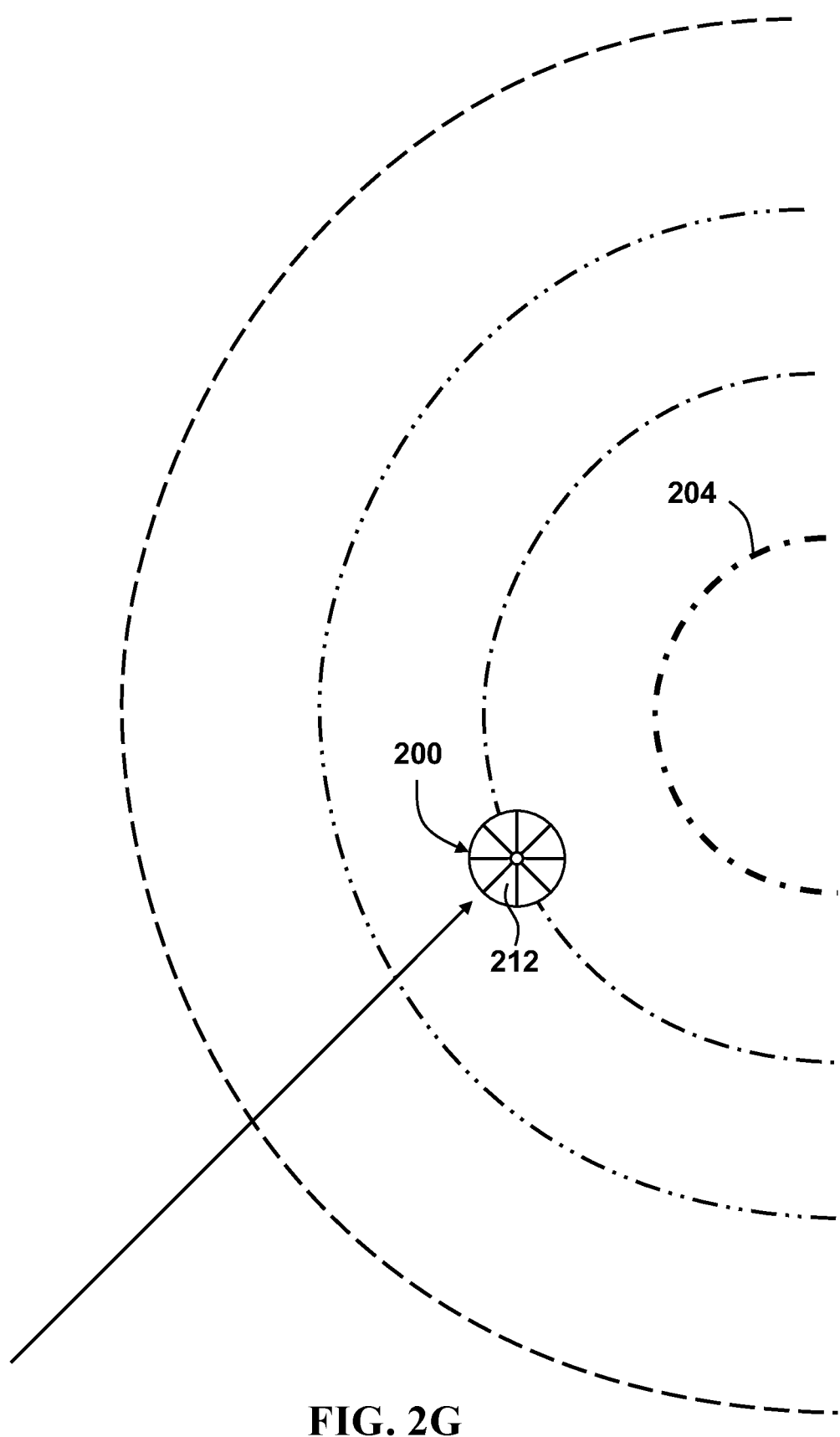
FIG. 2G depicts the exemplary UAS of FIG. 2A having deployed a parachute as a flight limitation upon crossing the third flight boundary in order to bring down the UAS before entering the airspace from which it is prohibited.

FIG. 2G depicts the exemplary UAS of FIG. 2A having deployed a parachute to bring down the UAS before entering the airspace from which it is prohibited. The FLC and/or UAS controller may effect deployment of a parachute 212 as a third flight limitation in order to keep the UAS 200 from entering the prohibited flight area 204. The parachute 212 creates enough drag to prevent further flight of the UAS 200 into the prohibited flight area 204. The parachute 212 may be deployed along with a command to turn off the UAS propulsion devices, e.g., motors, in order to bring down the UAS. In some embodiments, the parachute 212 may be mounted on the UAS in a position to create an asymmetrical force on the UAS that renders the UAS unable to fly (See FIG. 11)

Figure 2H:
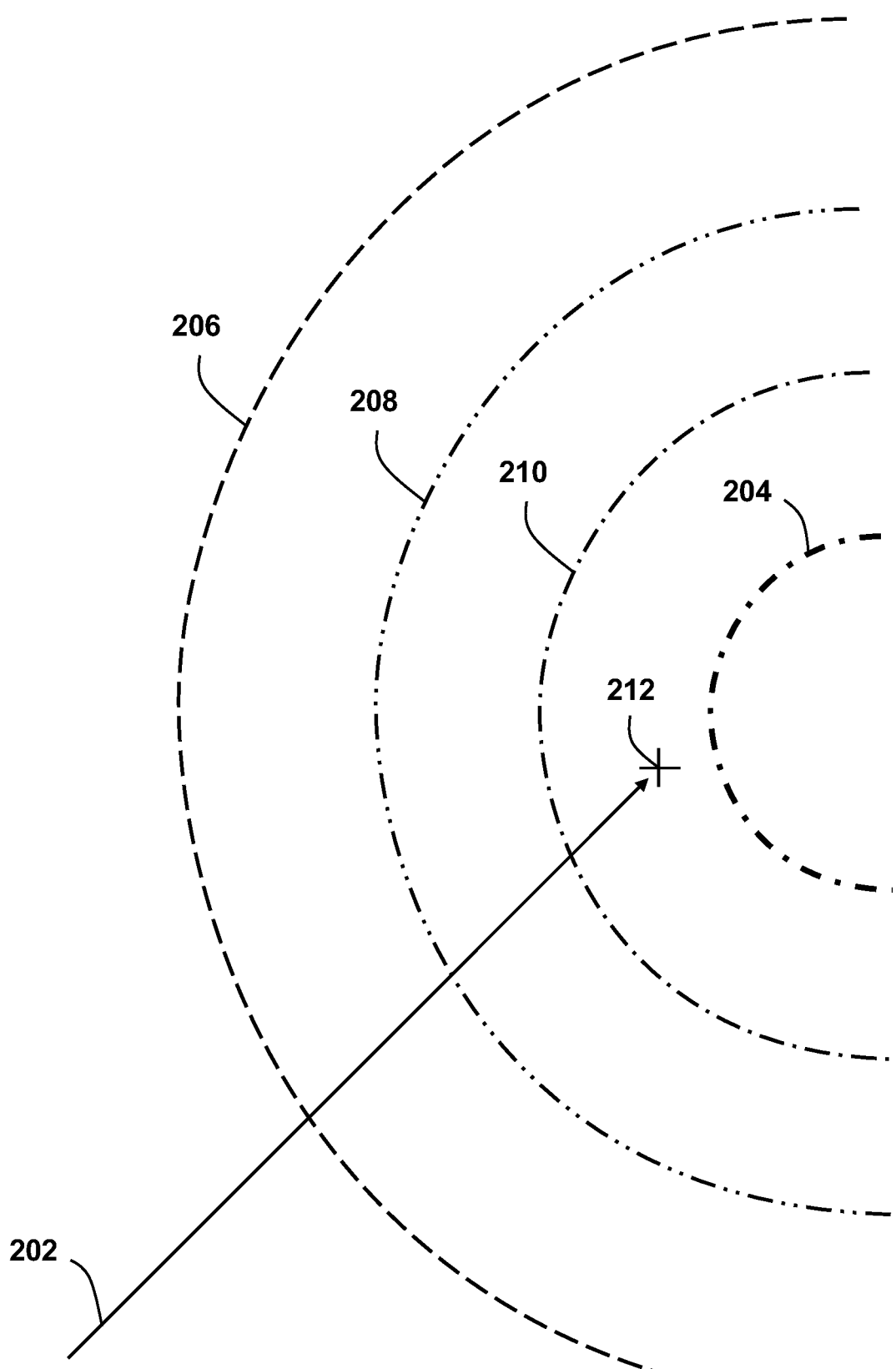
FIG. 2H depicts the exemplary UAS of FIG. 2A having landed on the ground prior to entering the airspace from which it is prohibited in response to the deployment of the parachute and/or other flight limitations.

FIG. 2H depicts the exemplary UAS of FIG. 2A having landed on the ground prior to entering the airspace from which it is prohibited. The trajectory 202 shows the UAS has landed 212 on the ground prior to entering the airspace from which it is prohibited after deploying a parachute (FIG. 2G) and/or entering a spiral (FIG. 2F). In other embodiments, the FLC and/or UAS controller may cut power to one or more UAS propulsion devices, reverse power to one or more propulsion devices, separate a wing or other component of the UAS such that continued flight is not sustainable, and/or activate an explosive charge. In some embodiments, the flight limitations may be dynamic and offer the UAS operator and/or UAS controller an opportunity to correct the UAS trajectory before taking more drastic action, e.g., deploying a parachute and/or grounding the UAS.

Figure 3:
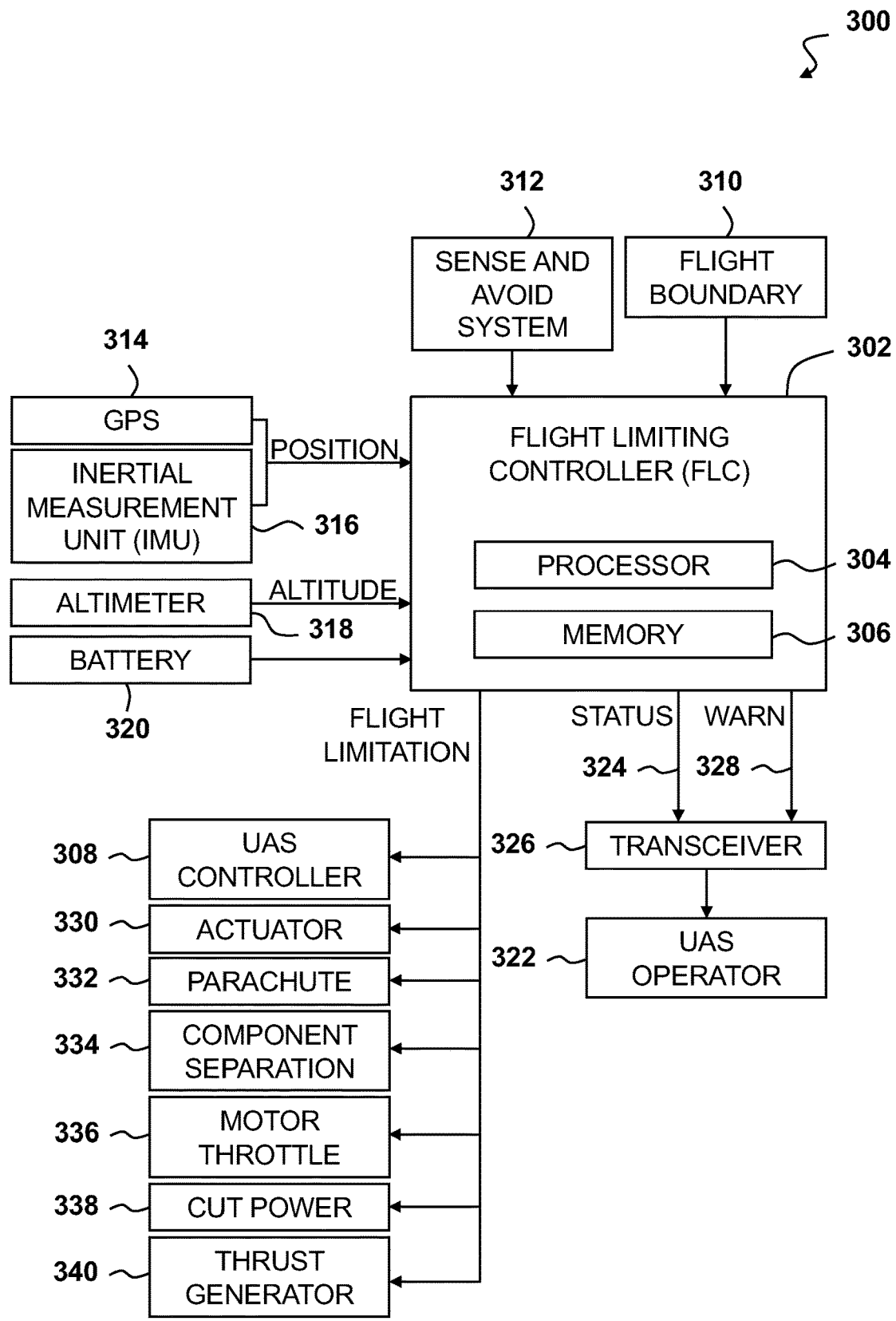
FIG. 3 depicts an exemplary flight limiting controller (FLC) having a processor with addressable memory, which receives inputs, sends status or warn signals, and effects one or more flight limitations.

FIG. 3 depicts an exemplary flight limiting controller (FLC) having a processor with addressable memory 300. A FLC 302 may include a processor 304 and memory 306. The FLC 302 may be an independent device from a UAS controller 308 (See FIGS. 5-8), or integrated with the UAS controller 308 (See FIG. 4). The degree of integration between the FLC 302, UAS controller 308, inputs, and outputs may be varied based on the reliability of the system components. Having the FLC 302 separate from the UAS controller 308 provides the FLC 302 with ultimate supervisory control over the flight of the UAS across the flight boundary or otherwise into the airspace from which it is prohibited. While a malfunction of a portion of the UAS, a malfunction of user programming of the UAS flight course, and/or a UAS operator 322 error may cause the UAS to cross a flight boundary, the FLC 302 may override the UAS controller 308 and effect a flight boundary limitation, e.g., terminate the flight.

The FLC 302 may receive an input defining a flight boundary 310. The flight boundary 310 may provide data defining a flight boundary of a UAS and/or airspace from which it is prohibited. The flight boundary 310 may be downloaded from an external source, e.g., a geofence from a third party server, and stored in the FLC 302 memory 306. The flight boundary 310 may be loaded prior to a UAS takeoff and/or dynamically updated during flight, e.g., due to changing conditions and/or updated restrictions. In some embodiments, the flight boundary 310 may be preloaded in the memory 306.

The FLC 302 may also receive an input from a sense and avoid system 312. The sense and avoid system 312 may be a radar, a sonar, an optical sensor, and/or LIDAR system. The sense and avoid system 312 may provide information on any objects that could collide and/or otherwise interfere with the operation of the UAS, e.g., towers (See FIG. 1), tall trees, and/or manned aircraft. The sense and avoid system 312 may also receive inputs from other aircraft, e.g., a signal from an emergency vehicle notifying aircraft to not enter an airspace due to firefighting activities. The sense and avoid system 312 and flight boundary 310 inputs may be used by the FLC 302 to avoid entering prohibited and/or dangerous airspace.

The FLC 302 may also receive input from a global positioning system (GPS) 314 and inertial measurement unit (IMU) 316 to determine the UAS position. An altimeter 318 input may be used by the FLC 302 to determine the UAS attitude. The GPS 314, IMU 316, and altimeter 318 may be separate and/or redundant devices that only provide input to the FLC 302. In some embodiments, the GPS 314, IMU 316, and/or altimeter 318 may be used by both the FLC 302 and the UAS controller 308. In some embodiments, the FLC 302 may pass through one or more inputs received (310, 312, 314, 316, 318) to the UAS controller 308 as a backup, if a corresponding device in the UAS fails, and/or for primary use due to a higher system integrity of the device input being received by the FLC 302. In some embodiments, the inputs received (310, 312, 314, 316, 318) may be stored in the FLC 302 memory 306 as a "black box" recording of UAS flight data.

A battery 320 may be used to power the FLC 302. The position inputs (314, 316) and altitude input 318 may be used in combination with the flight boundary input 310 and sense and avoid system input 312 to determine, by the processor 304 of the FLC 302, the UAS position relative to one or more flight boundaries, if those one or more flight boundaries have been crossed, and/or whether at least one flight limitation of the UAS should be effected upon crossing those one or more flight boundaries.

The flight limitations may be dynamic and offer a UAS operator 322 and/or a UAS autopilot of the UAS controller 308 a chance to correct the UAS trajectory prior to additional flight limitations (See FIGS. 2A-2H). The FLC 302 may send a status signal 324, via a transceiver 326, to the UAS operator 322. The UAS operator 322 may use a UAS operator controller having a UAS operator controller processor having addressable memory. The UAS controller processor may receive a status of the UAS, where the status may include data on at least one of: the UAS power source 320, the UAS controller 308, the UAS navigation device, the UAS radio, and the at least one propulsion device. The UAS controller processor may also receive a warning if the determined UAS position crosses the at least one flight boundary.

The status signal 324 may include data on any inputs (310, 312, 314, 316, 318, 320) to the FLC. The status signal 324 may also notify the UAS operator 322 that the UAS has not crossed any flight boundaries. As an initial flight limitation, the FLC may send a warn signal 328 to the UAS operator 322 if a first flight boundary has been crossed (See FIG. 2B). The UAS operator 322 may set the FLC 302 to provide one or more flight limitations and the level of each flight limitation, e.g., set a first flight boundary to send out a warn signal 328 or set a first flight boundary to engage an autopilot of the UAS controller 308. The UAS operator may also set the FLC 302 to determine at least one flight boundary based on a speed and trajectory of the UAS and/or a set distance range of the UAS to a flight boundary. The flight limitations of the FLC 302 may be varied, within set parameters, based on the use and/or needs of the UAS operator 322.

If additional flight boundaries are crossed, additional flight limitations may be effected. An autopilot of the UAS controller 308 may direct the UAS away from the flight boundary (See FIG. 2D). An actuator 330 may be actuated to a maximum deflection in order to maintain the UAS in a circular flight pattern that prevents the UAS from entering the flight boundary (See FIG. 2F). The actuator 330 may be part of the UAS and/or a separate actuator with a system integrity meeting the desired standards. In some embodiments, a UAS rudder may be spring loaded, such that a loss of power to the actuator returns the rudder to a maximum deflection which would maintain the UAS in a circular flight pattern (See FIG. 2F). A parachute 332 may be deployed which prevents the UAS from crossing the flight boundary (See FIG. 2G). In a quadcopter-style embodiment, the propulsion devices, e.g., motors, of the UAS may be powered off prior to deploying the parachute 332. One or more components of the UAS may be separated 334, e.g., by shearing a pin connecting a wing to the fuselage, such that the resulting UAS is incapable of continuing its trajectory and crossing over the flight boundary. The propulsion device throttle 336 may be arrested so as to gradually land the UAS, set to zero so as to bring down the UAS faster, and/or reversed so as to bring down the UAS fastest. The power may be cut 338 to the one or more propulsion devices of the UAS. In a quadcopter-style UAS, cutting power to only one of the propulsion devices may be used to reliably bring down the UAS (See FIG. 10). A separate thrust generator 340 may be used to bring down the UAS and/or alter its trajectory (See FIG. 11).

In order to achieve a set system integrity, e.g., a catastrophic criticality of $1*10^{-7}$, each element in the system must meet this criteria including hardware and software. A development assurance process has been defined in the RTCA Document DO-178C, titled: "Software Considerations in Airborne Systems and Equipment Certification." The DO-178C document provides guidance to determine if software will perform reliably in an airborne environment. For software based mitigation to hazards with "catastrophic" criticality, the requirement is typically Development Assurance Level (DAL) "A" (reduced to "B" for General Aviation). This is indeed a very high bar for any piece of avionic equipment, but especially for a technology, e.g., UAS, that is supposed to reduce costs and complexity of performing many varied tasks in aviation. Since UAS are software intensive vehicles, the addition of software driven systems for limiting UAS flight would necessarily drive all the software to DAL A or B requirements, resulting in software cost increases of orders of magnitude over what is currently done in the industry. As such, a need exists for a highly reliable but low cost device or system that will limit or otherwise control a UAS to prevent, or at least greatly reduce, the possibility of the UAS entering airspace occupied by manned aircraft and/or colliding with such aircraft.

Figure 4:
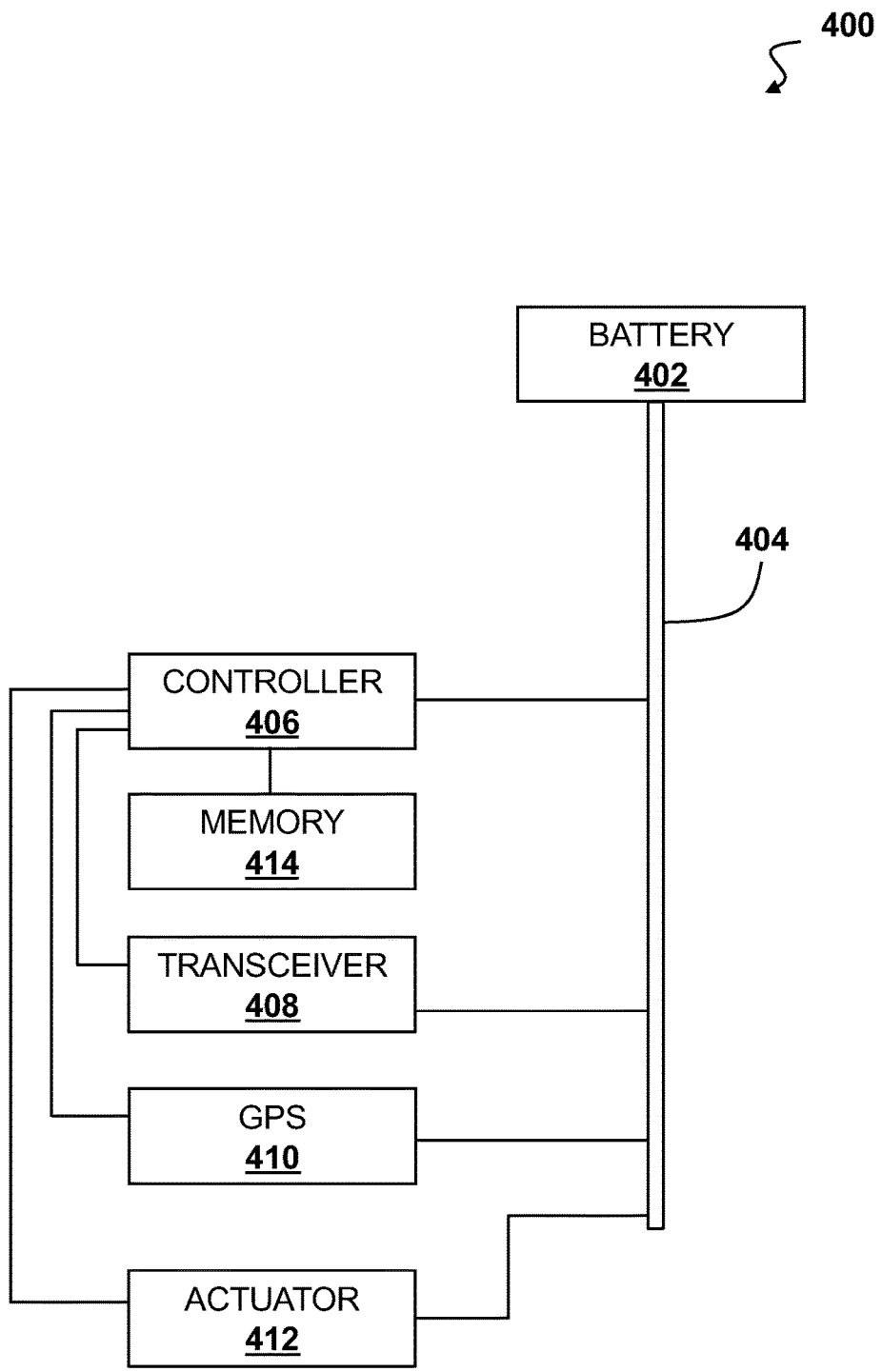
FIG. 4 depicts a system architecture of a UAS having flight limiting aspects incorporated into a UAS controller for effecting flight limitations of the UAS.

FIG. 4 depicts a system architecture of a UAS having flight limiting aspects incorporated into the UAS controller 400. The system architecture 400 includes a power source, e.g., a battery 402, connected to a power bus 404. The power bus 404 supplies power to a UAS controller 406; a radio, e.g., a transceiver 408; a navigation device, e.g., a GPS 410; and a control device, e.g., an actuator 412. The UAS controller 406 has memory 414.

The UAS controller 406 includes a microprocessor and functions to control the flight of the UAS. The UAS controller 406 and all elements meet the required criticality standards. The UAS controller 406 may determine the UAS position and effect at least one flight limitation if the determined UAS position crosses at least one flight boundary. The UAS controller 406 may receive direction commands from either the transceiver 408 and/or memory 414. The UAS controller 406 may receive a current position, heading, speed, and/or altitude from the GPS 410 and/or other inputs (See FIG. 3). The UAS controller 406 may determine a heading and instruct one or more control surfaces to move, e.g., the actuator 412 moving a rudder. The actuator 412 may be attached to any of a variety of control surfaces including a rudder, an elevator, flaps, aileron, or the like, provided that deflection of such control surface is be sufficient to cause the flight to terminate upon command to do so. In other embodiments, the actuator 412 may be replaced and/or supplemented with another flight limiting device, e.g., a parachute, UAS component separator, throttle control, power switch, and/or thrust generator.

Figure 5:
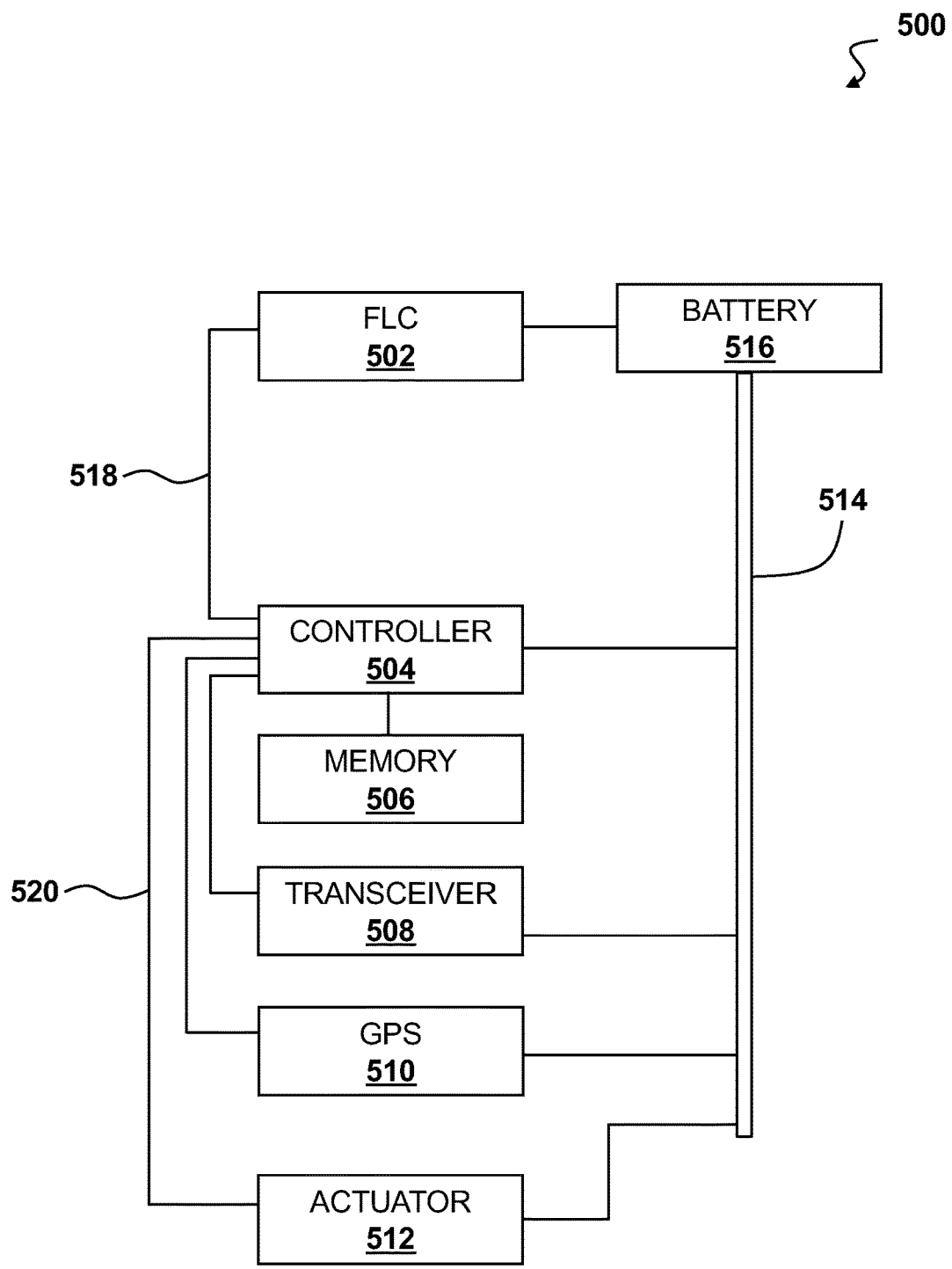
FIG. 5 depicts a system architecture of a UAS having a FLC added to the UAS and in communication with the UAS controller in order to effect flight limitations.

FIG. 5 depicts a system architecture of a UAS having a FLC added to the UAS and in communication with the UAS controller to effect flight limitations 500. A FLC 502 is added to an existing, e.g., off-the-shelf, UAS system architecture 500. The FLC 502 is in communication with a UAS controller 504, such that the FLC 502 may receive UAS location data, UAS status data, and/or flight boundary data from the UAS controller 504. The FLC can separately, and independently from the UAS controller 504, determine the UAS position, determine if the UAS has crossed at least one flight boundary, and determine if a flight limitation, e.g., a flight termination, needs to be effected. The flight boundary data may be retained in a memory 506, which may be accessed via the UAS controller 504.

The FLC 502, controller 504, transceiver 508, GPS 510, and actuator 512 may be powered by a power bus 514 from a battery 516. In some embodiments, the FLC 502 may have an independent and/or backup power source. To effect a flight limitation, e.g., flight termination, the FLC 502 transmits a signal over a communication connection 518 to the UAS controller 504. The UAS controller 504 may then transmit an actuation signal 520 to the actuator 512 to move a control surface, e.g., a rudder, to a maximum deflection. In this embodiment, each of the FLC 502, UAS controller 504, battery 516, power bus 514, memory 506, GPS 510, and actuator 512 need to be sufficiently reliable to meet the overall UAS reliability requirements.

Figure 6:
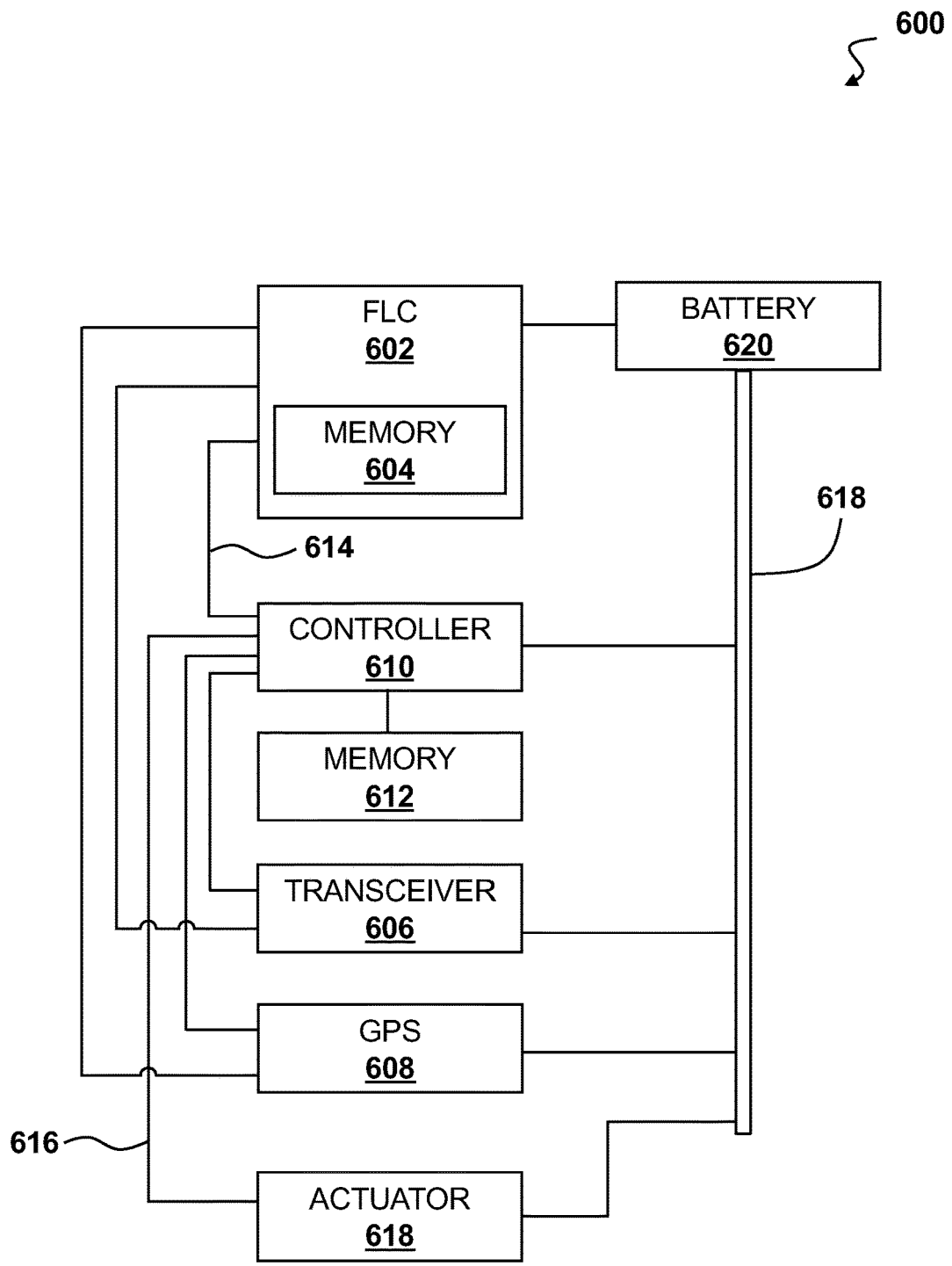
FIG. 6 depicts a system architecture of a UAS having a FLC with memory added and in communication with the UAS controller, UAS transceiver, and UAS GPS in order to effect flight limitations.

FIG. 6 depicts a system architecture of a UAS having a FLC with memory added and in communication with the UAS controller, UAS transceiver, and UAS GPS to effect flight limitations 600. A FLC 602 with memory 604 is added to a UAS system architecture, with direct links from the UAS to the transceiver 606 and GPS 608. The FLC 602 is also in communication with the UAS controller 610 having a separate memory 612. The FLC 602 may store flight limitations in memory 604. The FLC 602 may also send status and/or warn signals to a UAS operator via the transceiver 606. The FLC 602 may send a flight limitation signal 614 to the UAS controller 610. The UAS controller 610 then sends an actuation signal 616 to an actuator 618. Power may be provided to the FLC 602, controller 610, transceiver 606, GPS 608, and actuator 618 via a power bus 618 from a battery 620.

Figure 7:
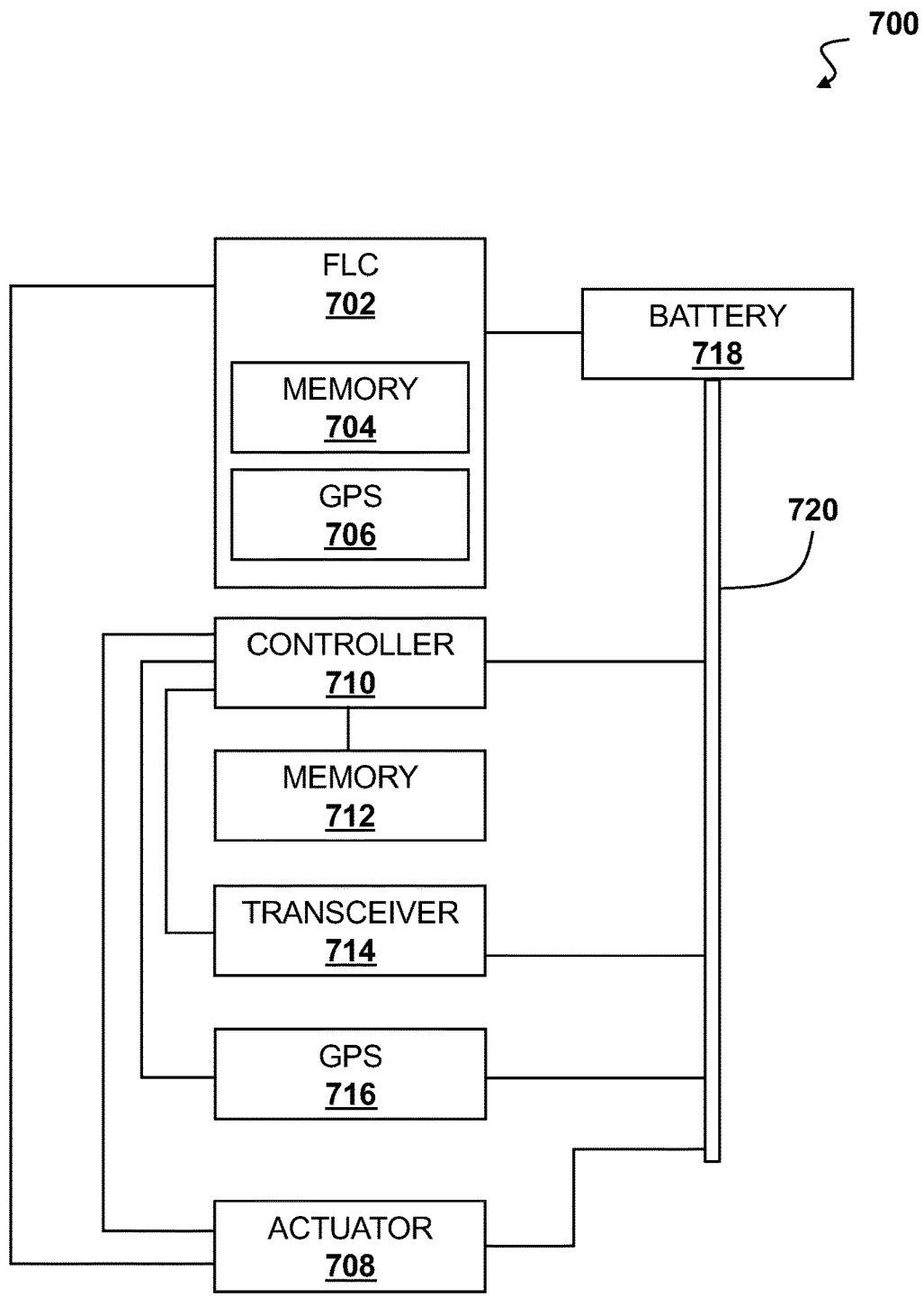
FIG. 7 depicts a system architecture of a UAS having a FLC with memory and a GPS added and in communication with an actuator in order to effect flight limitations.

FIG. 7 depicts a system architecture of a UAS having a FLC with memory and a GPS added and in communication with an actuator to effect flight limitations 700. A FLC 702 having a separate memory 704 and one or more separate inputs, e.g., a GPS 716, may be added to a UAS system architecture. The FLC 702 may directly send an actuation command to an actuator 708. The actuator 708 takes precedence of any control signals from the FLC 702 over any control signals from the UAS controller 710. In some embodiments, the FLC 702 may control an independent actuator. The FLC 702 may be independent from a UAS controller 710 having memory 712, and connected to a transceiver 714 and GPS 716. The UAS controller 710 may be used by a UAS operator to control the UAS. If the FLC 702 determines that the UAS has crossed a flight boundary, then the FLC 702 may effect a flight limitation directly, without an input from the UAS controller 710, memory 712, transceiver 714, and/or GPS 716. Accordingly, only the FLC 702, battery 718, power bus 720, memory 704, GPS 716, and actuator 708 elements of the system need to be sufficiently reliable to meet the overall UAS reliability requirements. The UAS controller 710, memory 712, transceiver 714, and GPS 716 may have a lower cost and/or reliability, because they are not needed to prevent the UAS from entering airspace from which it is prohibited.

Figure 8:
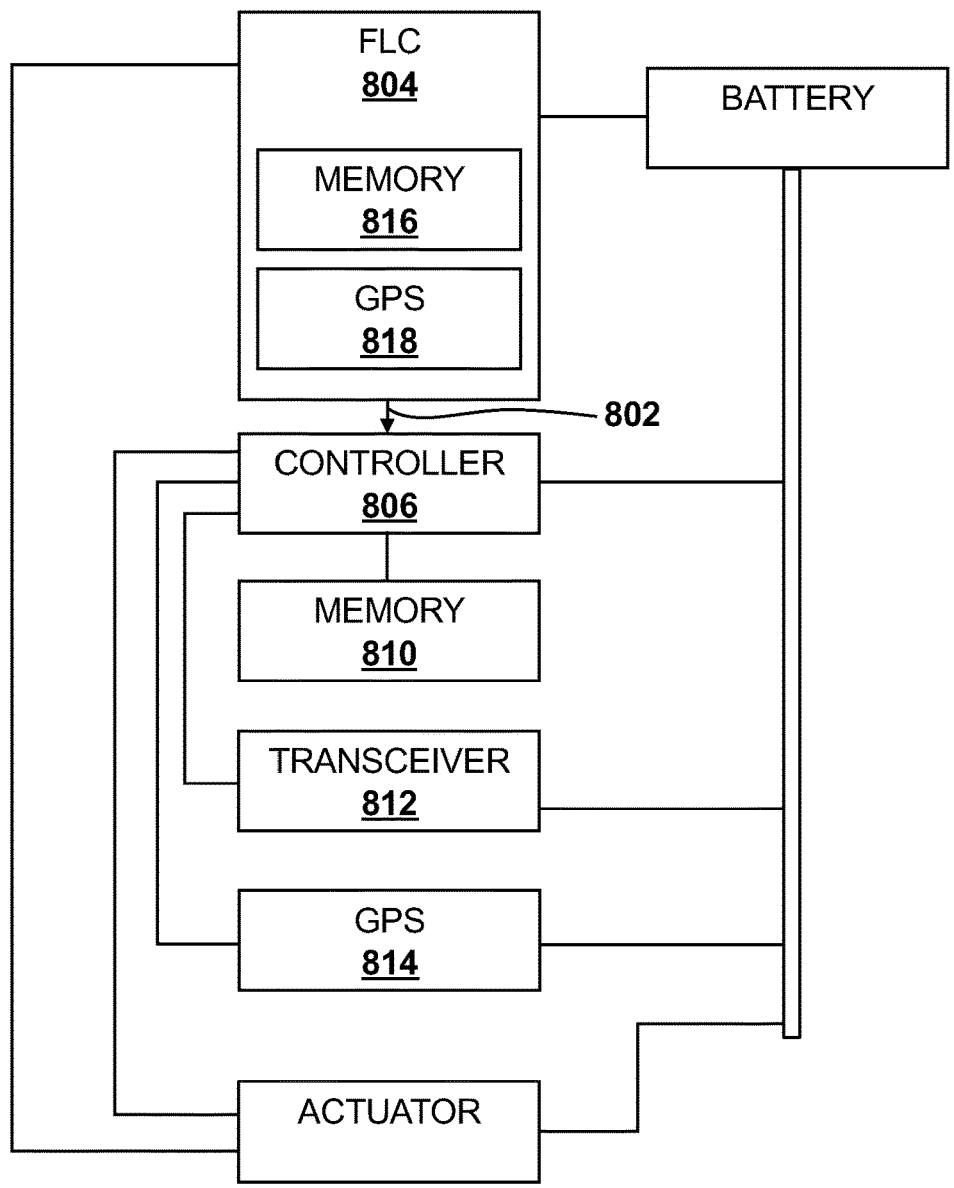
FIG. 8 depicts a system architecture of a UAS having a FLC with memory and a GPS added and in communication with an actuator in order to effect flight limitations and in one-way communication with the UAS controller for passing data from the FLC to the UAS controller.

FIG. 8 depicts a system architecture of a UAS having a FLC with memory and a GPS added and in communication with an actuator to effect flight limitations and in one-way communication with the UAS controller 800. The system architecture of FIG. 8 is similar to the system architecture shown in FIG. 7, with the exception of a one-way signal 802 from the FLC 804 to the UAS controller 806. In the event of a failure of the memory 810, transceiver 812, and/or GPS 814, the FLC 804 may send a signal 802 from its own memory 816 and/or GPS 818 to the controller 806. In some embodiments, the controls and/or inputs from an independent FLC 804 may have a higher system integrity and/or accuracy than similar and/or identical control and/or inputs to the UAS controller 806. A UAS operator may set up the UAS such that the FLC 804 provides these controls and/or inputs to the UAS controller 806 so as to increase the reliability and/or functioning of the UAS. As the FLC 804 is already receiving and/or determining data for its own determinations of UAS location and flight boundaries, this data may be also be used by the UAS controller 806, if desired.

Figure 9:
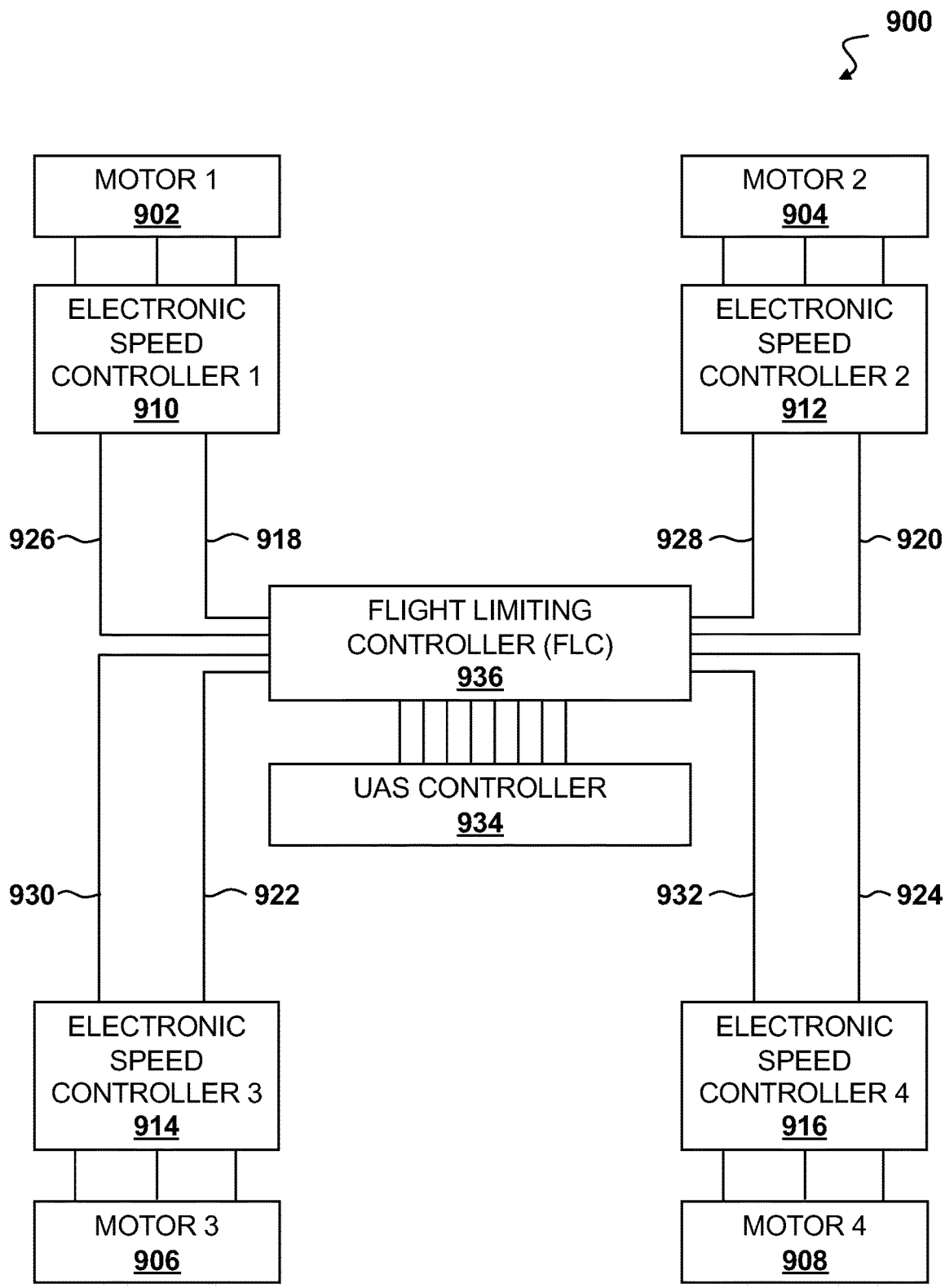
FIG. 9 depicts a system architecture of a quadcopter-style UAS having a FLC connected in between the UAS controller and each electronic speed controller as a wiring harness in order to effect flight limitations.

FIG. 9 depicts a system architecture of a quadcopter-style UAS having a FLC connected in between the UAS controller and each electronic speed controller to effect flight limitations 900. A quadcopter-style UAS may have four propulsion devices, e.g., motors (902, 904, 906, 908) which are each controlled by a corresponding electronic speed controller (910, 912, 914, 916). In a typical quadcopter-style UAS, each electronic speed controller (910, 912, 914, 916) may have respective power connections (918, 920, 922, 924)

and signal connections (926, 928, 930, 932). These connections (918, 920, 922, 924, 926, 928, 930, 932) may be wired into a UAS controller 934 with a wiring harness.

A quadcopter-style UAS may allow for the quick removal and replacement of any individual motor and/or electronic speed controller, and so typically utilize wiring harnesses for easy connections. Instead of being directly connected into the UAS controller 934, these connections (918, 920, 922, 924, 926, 928, 930, 932) may be connected into a FLC 936. The FLC 936 may then pass these connections through to the UAS controller 934, and the UAS controller 934 may continue to function as if it were directly connected. The FLC 936 may determine the UAS position relative to any flight boundaries and effect at least one flight limitation if a flight boundary is crossed. The flight limitations of the FLC 936 may include reducing, cutting, and/or reversing the throttle of one of the motors (902, 904, 906, 908) to terminate the flight. As the FLC is positioned between the UAS controller 934 and each of the motors (902, 904, 906, 908), only the FLC 936 needs to be sufficiently reliable to meet the overall UAS reliability requirements. Accordingly, the FLC 936 may be retrofit onto an existing UAS, e.g., via a wiring harness designed to fit the existing UAS, that does not otherwise meet UAS reliability requirements. The resulting UAS, with retrofit FLC 936, will meet the UAS reliability requirements.

Figure 10:
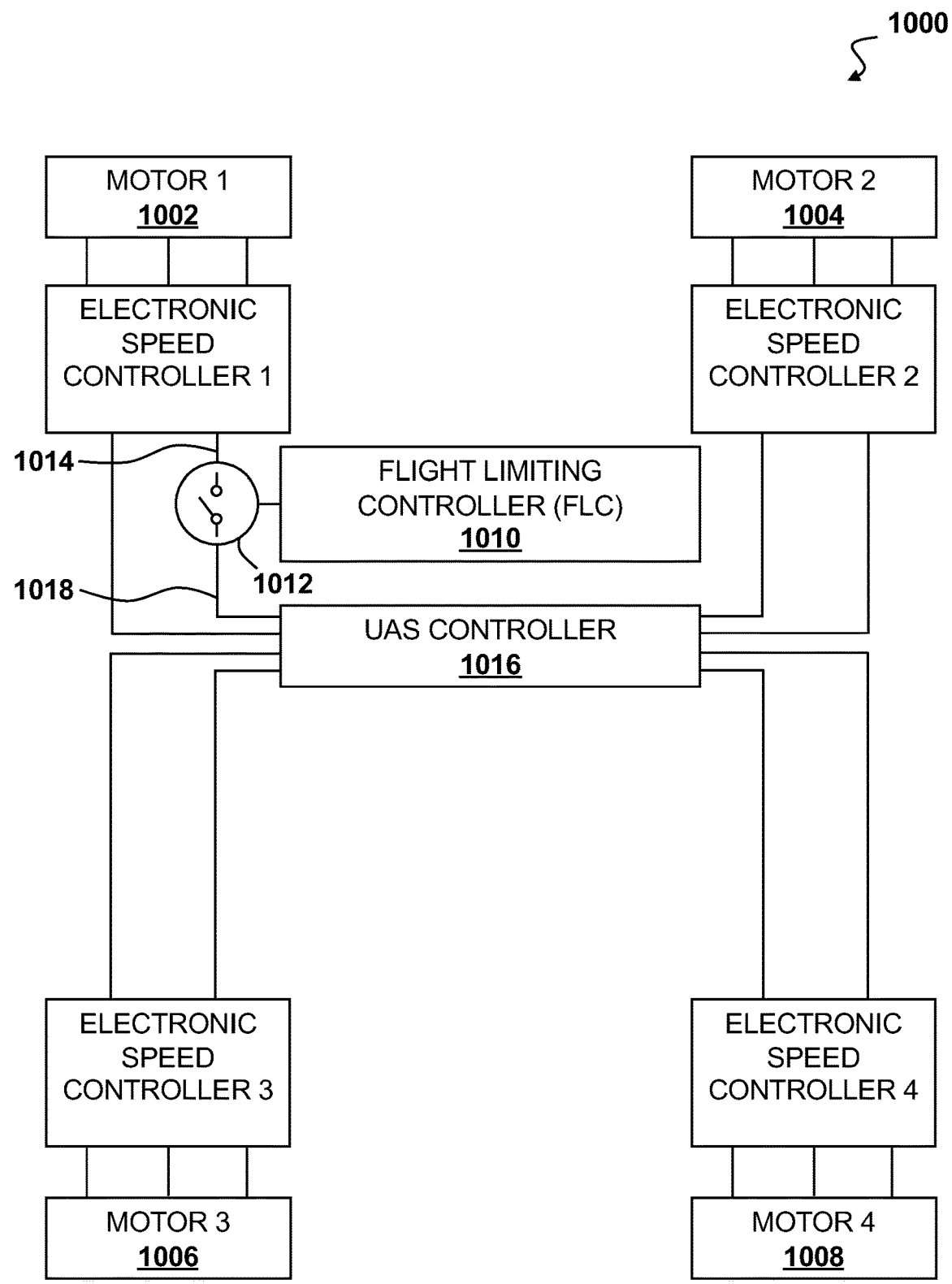
FIG. 10 depicts a system architecture of a quadcopter-style UAS having a FLC connected to a switch in between one of the electronic speed controllers and the UAS controller to cut power to one of the UAS propulsion devices as a flight limitation.

FIG. 10 depicts a system architecture of a quadcopter-style UAS having a FLC connected to a switch in between one of the electronic speed controllers and the UAS controller 1000. For a typical quadcopter-style UAS, the reducing, cutting, and/or reversing of the throttle of only one propulsion device, e.g., motor 1002 of the four motors (1002, 1004, 1006, 1008), may reliably terminate the UAS flight. A FLC 1010 may be connected to a switch 1012, e.g., a mechanical switch having a high reliability, positioned along a power connection 1014. The power connection 1014 may be moved from a UAS controller 1016 to the switch 1012 and then passed through 1018 to the UAS controller 1016. In this embodiment, the FLC 1010 complexity may be reduced and UAS flight termination reliability may be increased. The FLC 1010 may determine the UAS position relative to any flight boundaries and effect at least one flight limitation, e.g., activating the switch 1012 to cut power to the motor 1002, if a flight boundary is crossed. In some embodiments, multiple switches may be used and may be connected along control signals and/or power signals.

Figure 11:
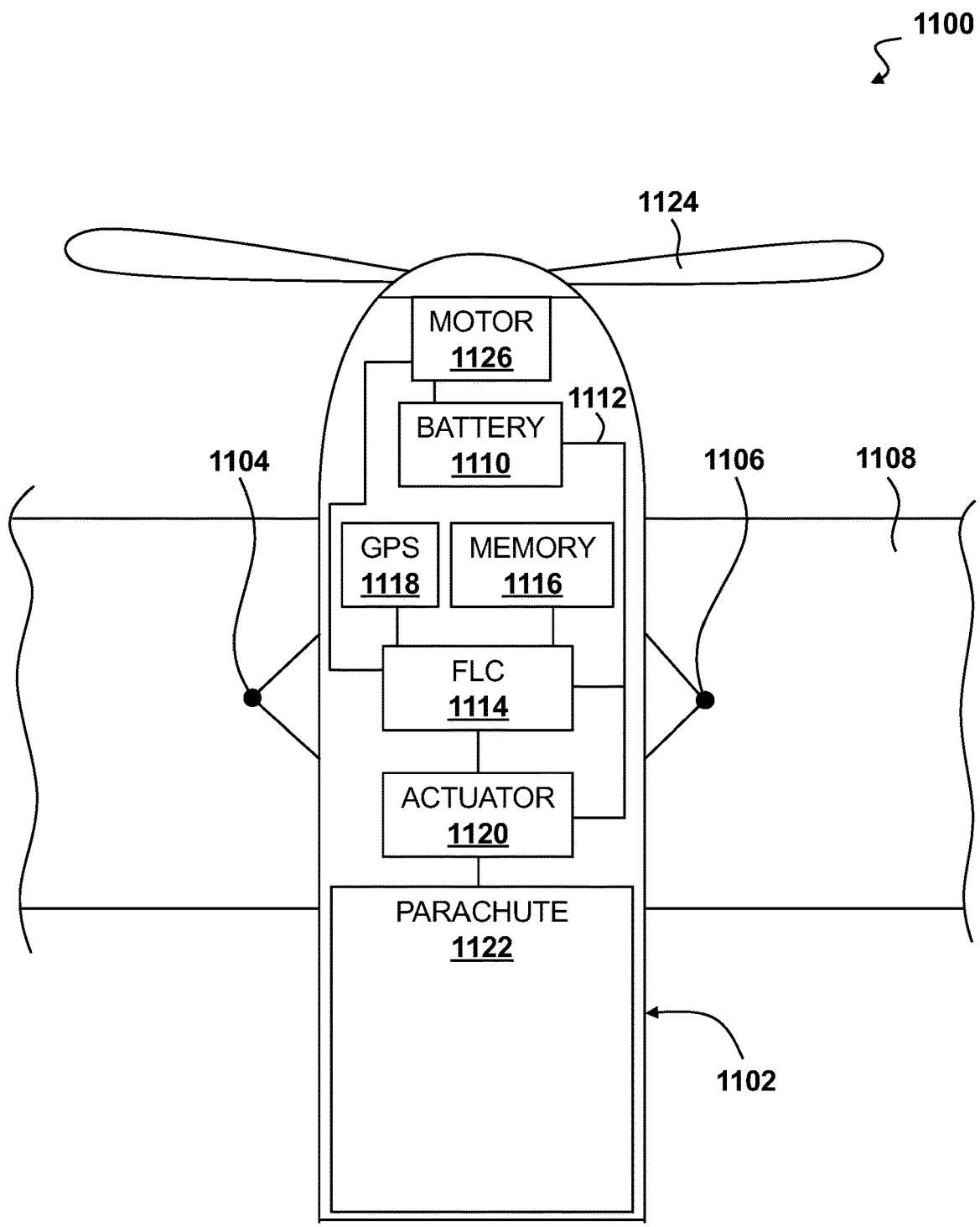
FIG. 11 depicts an independent flight limiting device (FLD) that may be detachably attached to one or more UAS systems in order to effect flight limitations and include a separate thrust generator and/or parachute.

FIG. 11 depicts an independent FLC that may be detachably attached to one or more UAS systems in order to effect flight limitations 1100. A flight limiting device (FLD) 1102 may be detachably attached via one or more detachable attachments (1104, 1106) to a UAS, e.g., to a UAS wing 1108. The FLD 1102 is a self-contained device independent from the UAS it is attached thereto. The only interface between the FLD 1102 and the UAS are the detachable attachments (1104, 1106). In some embodiments, the FLD 1102 may be attached to other areas of the UAS, e.g., the UAS fuselage.

The FLD 1102 functions as in the other embodiments shown herein, determining the UAS position and effecting a flight limitation if the UAS position crosses a flight boundary. By being separate from the operational components of the UAS, the UAS vehicle does not have to be modified, except to the extent necessary to mount the FLD 1102 to the UAS. The components of the UAS do not have to meet the high reliability requirements needed to operate near manned aircraft operations or near sensitive areas on the ground. As long as the FLD 1102, and its components, meet these reliability requirements, the UAS may operate in these areas.

The FLD 1102 may have a minimum of components and/or software. The FLD 1102 may be produced as a common design for use with any of a variety of different pre-existing UAS designs, which results in decreased costs and increased reliability. Such a FLD 1102 may be used on more than a single UAS. A UAS operator may have several different air vehicles for different purposes, but since the UAS operator may only fly one at a time, the UAS operator will only need one FLD 1102 which may be moved between those UAS as needed.

The FLD 1102 includes a power source such as a battery 1110, power bus 1112, FLC 1114, memory 1116, navigation means such as a GPS 1118, an actuator 1120, and a means for terminating the flight such as a parachute 1122. The FLC 1114 is powered by the battery 1110 and functions to receive the UAS location from the GPS 1118, compares it to a boundary saved in the memory 1116, and if it is determined that the UAS has passed the boundary to instruct the actuator 1120 to deploy the parachute 1122 to terminate the flight.

The parachute 1122 may eject out the back of the FLD 1102, such that when deployed the parachute 1122 will be of a size and configuration to produce, at the wing 1108, sufficient drag that the resulting asymmetrical force on the UAS will render it unable to continue to fly. The further out on the wing 1108 from the fuselage the FLD 1102 is detachably attached, the greater lever arm is provided and the smaller, relatively, the parachute 1122 needs to be to create sufficient drag to terminate the flight. In some embodiments the same FLD 1102 may be employed for air vehicles of different sizes, with either different sized parachutes being used and/or varying placement along the wing, e.g. further out on the wing from the fuselage for larger air vehicles. In some embodiments, the parachute 1122 holder, with the actuator 1120, may disconnect from the rest of the FLD 1102, such that different parachutes may be attached for different uses of the FLD 1102.

Instead of the parachute 1122, the FLD 1102 may employ any of a variety of means to terminate the flight including, but not limited to, an explosive charge, a wing separator, a reverse thrust generator, e.g. a separate propeller 1124 and propulsion device, e.g., motor 1126, a command to the UAS or ground station, or the like. In some embodiments, the FLD 1102 may include a power generator that uses the airflow past the FLD 1102 caused by the UAS flying, to provide power to the FLD 1102 and/or to recharge the battery 1110. Also, the generator may be commanded by the FLC 1114 to provide reverse thrust to cause a flight termination.

To improve reliability, in some embodiments the FLD 1102 may be set in a fail-safe configuration. For example, the parachute 1122 may have a default of being deployed unless the actuator 1120 is powered, e.g., by an electro magnet that holds the parachute 1120 in place only if it is powered, such as by a spring pushing the parachute 1120 against the powered electromagnet. That is, if power is lost the actuator 1120 will automatically release the parachute 1122 and the flight of the UAS will immediately terminate. Likewise, in some embodiments the FLC 1114 may be programmed to deploy the parachute 1122 in the event any internal error occurs, such as a prolonged loss of GPS link.

Figure 12:
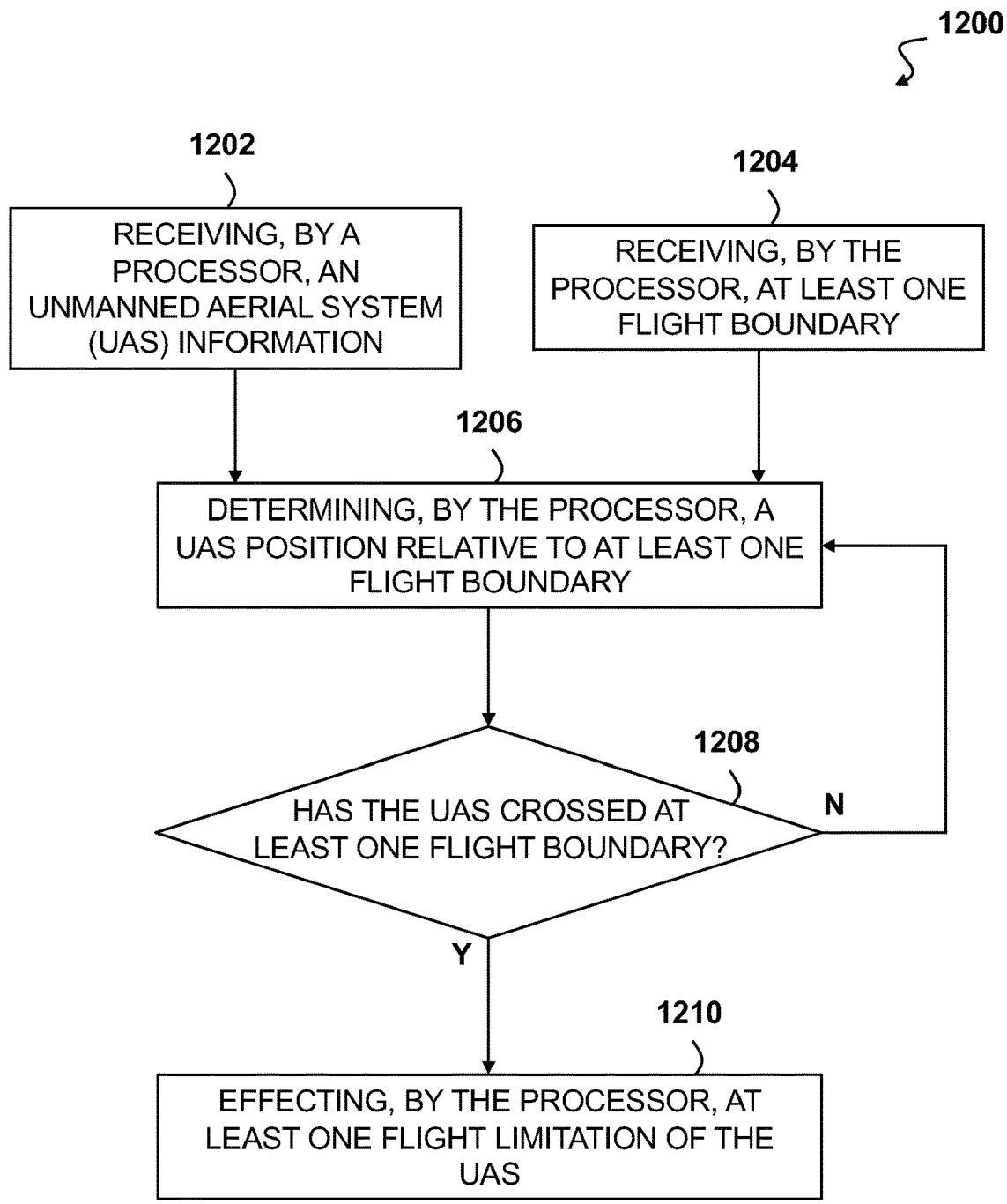
FIG. 12 depicts an exemplary functional block diagram of an embodiment for effecting flight limitations if the UAS has crossed a flight boundary.

FIG. 12 depicts an exemplary functional block diagram of an embodiment for effecting flight limitations if the UAS has crossed a flight boundary 1200. A processor may receive UAS information (step 1202). The UAS information may include data from a GPS, IMU, altimeter, and/or sense and avoid system (See FIG. 3). The processor may also receive at least one flight boundary (step 1204). The flight boundary may include airspace from which it is prohibited, obstacles set by a UAS operator, and one or more dynamic boundaries created by the processor and/or UAS operator input to prevent UAS entry into the airspace from which it is prohibited, interference with manned aircraft, and/or collision with obstacles (See FIGS. 1 and 2A-2H). The flight boundary may be made smaller by a UAS operator, but may not be enlarged. The processor may determine the UAS position relative to at least one flight boundary (step 1206). The processor may utilize the UAS information and flight boundaries to determine the UAS position. The processor may then determine if the UAS has crossed the at least one flight boundary (step 1208). If the UAS has not crossed at least one flight boundary, then the processor continues to determine the UAS position relative to the flight boundaries. If the UAS has crossed at least one flight boundary, then the processor effects at least one flight limitation of the UAS (step 1210). The flight limitations may include a warning signal and/or one or more dynamic responses to ensure that the UAS does not enter airspace from which it is prohibited (See FIG. 3).

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention is herein disclosed by way of examples and should not be limited by the particular disclosed embodiments described above.

What is claimed is:

1. A method comprising:
   determining, by a processor of a flight limiting device (FLD) having addressable memory, a three-dimensional position of an unmanned aerial system (UAS) relative to at least one flight boundary encompassing a prohibited flight area;
   determining, by the processor of the FLD, an error in a trajectory of the UAS that will cross the at least one flight boundary within a set time, wherein the error is determined based on the determined three-dimensional position of the UAS; and
   effecting, by the processor of the FLD, at least one flight limitation based on the determined error in the trajectory, wherein the effected at least one flight limitation prevents the UAS from entering the prohibited flight area.

2. The method of claim 1, further comprising:
   attaching the FLD to the UAS.

3. The method of claim 2, wherein the FLD is detachably attached to the UAS.

4. The method of claim 3, wherein the UAS has an operational reliability of at least $1*10^{-7}$ of preventing the UAS from crossing the at least one flight boundary when the FLD is detachably attached to the UAS.

5. The method of claim 2, wherein the UAS has a lower operational reliability when the FLD is detached from the UAS.

6. The method of claim 1, further comprising:
   determining, by the FLD processor, the UAS position relative to at least one user defined flight boundary; and
   effecting, by the processor of the FLD, at least one flight limitation of the UAS if the determined UAS position crosses the at least one user defined flight boundary;
   wherein the at least one user defined flight boundary is smaller than the prohibited flight area.

7. The method of claim 1, further comprising:
   receiving an input, by the processor of the FLD, from a sense and avoid system of at least one object that could interfere with the UAS;
   generating, by the processor of the FLD, at least one flight boundary based on the received input from the sense and avoid system; and
   effecting, by the processor of the FLD, at least one flight limitation of the UAS if the UAS position crosses the at least one generated flight boundary.

8. The method of claim 1, wherein the at least one flight boundary is updated by a user from a third-party database prior to a flight.

9. The method of claim 1, wherein the at least one flight boundary is updated during the flight of the UAS by at least one of: a sense and avoid system and a third-party database.

10. The method of claim 1, further comprising:
    determining, by the processor of the FLD, whether the determined three-dimensional position of the UAS has crossed a first flight boundary; and
    sending, by the processor of the FLD, a warning to a user when the first flight boundary is crossed by the UAS.

11. The method of claim 1, wherein a flight limitation of the at least one flight limitation comprises: grounding the UAS; deploying a parachute; separating one or more components of the UAS; an explosive charge; reversing a throttle to one or more propulsion devices of the UAS; and actuating an actuator to maintain the UAS in a circular flight pattern, wherein the circular flight pattern does not cross the at least one flight boundary, and wherein the circular flight pattern maintains the UAS outside of the prohibited flight area.

12. A system comprising:
    a highly reliable flight limiting device (FLD) configured to be detachably attached to a low operational reliability unmanned aerial system (UAS), the FLD comprising:
    a FLD processor having addressable memory, the FLD processor configured to:
        determine a three-dimensional position of the UAS relative to at least one flight boundary encompassing a prohibited flight area;
        determine an error in a trajectory of the UAS that will cross the at least one flight boundary within a set time, wherein the error is determined based on the determined three-dimensional position of the UAS; and
        effect at least one flight limitation of the UAS based on the determined error in the trajectory, wherein the effected at least one flight limitation prevents the UAS from entering the prohibited flight area.

13. The system of claim 12, further comprising:
    the low operational reliability UAS comprising a UAS processor with addressable memory.

14. The system of claim 13, wherein the UAS has an operational reliability of at least $1*10^{-7}$ of preventing the UAS from crossing at least one flight boundary when the FLD is detachably attached to the UAS, and wherein the UAS has a lower operational reliability when the FLD is detached from the UAS.

15. The system of claim 13, wherein the UAS further comprises:
a UAS navigation device;
a UAS radio; and
at least one UAS propulsion device; and
a UAS power source;
wherein the FLD is in communication with the UAS controller to effect the at least one flight limitation.

16. The system of claim 15 further comprising:
a UAS operator controller comprising:
a UAS operator controller processor having addressable memory, the UAS controller processor configured to:
receive a status of the UAS, wherein the status includes data on at least one of: the UAS power source, the UAS controller, the UAS navigation device, the UAS radio, and the at least one UAS propulsion device; and
receive a warning if the determined UAS position crosses the at least one flight boundary.

17. The system of claim 15, wherein the UAS navigation device further comprises a global positioning system (GPS), an inertial measurement unit (IMU), and an altimeter, wherein the UAS radio comprises a transceiver, and wherein the processor of the FLD is configured to receive an input from at least one of: the UAS power source, the UAS controller, the UAS navigation device, the UAS radio, and the at least one UAS propulsion device.

18. The system of claim 15, wherein the at least one flight limitation of the UAS comprises an actuation of an actuator to maintain the UAS in a circular flight pattern, wherein the circular flight pattern does not cross the at least one flight boundary, and wherein the circular flight pattern maintains the UAS outside of the prohibited flight area.

19. A method comprising:
attaching a highly reliable flight limiting device (FLD) to a first low operational reliability unmanned aerial system (UAS) having a processor and addressable memory, wherein the highly reliable FLD is detachably attached to the first UAS;
detaching the highly reliable FLD from the first UAS, wherein the first UAS has a lower operational reliability when the highly reliable FLD is detached from the first UAS;
attaching the highly reliable FLD to a second low operational reliability UAS having a processor and addressable memory, wherein the highly reliable FLD is detachably attached to the second UAS;
determining, by a processor of the highly reliable FLD having an addressable memory, a three-dimensional position of the highly reliable FLD relative to the at least one flight boundary encompassing a prohibited flight area;
determining, by the processor of the highly reliable FLD, an error in a trajectory of the second UAS that will cross the at least one flight boundary within a set time, wherein the error is determined based on the determined three-dimensional position of the FLD; and
effecting, by the processor of the highly reliable FLD, at least one flight limitation based on the determined error in the trajectory, wherein the effected at least one flight limitation prevents the second UAS from entering the prohibited flight area.

20. The method of claim 19, wherein the first UAS has an operational reliability of at least $1*10^{-7}$ of preventing the first UAS from crossing at least one flight boundary when the FLD is detachably attached to the first UAS, wherein the second UAS has an operational reliability of at least $1*10^{-7}$ of preventing the second UAS from crossing the at least one flight boundary when the highly reliable FLD is detachably attached to the second UAS, and wherein the second UAS has a lower operational reliability when the highly reliable FLD is detached from the second UAS.

* * * * *